(12) United States Patent
Ogata

(10) Patent No.: US 10,409,032 B2
(45) Date of Patent: Sep. 10, 2019

(54) CONVERTER LENS DEVICE AND PHOTOGRAPHING SYSTEM INCLUDING THE SAME

(71) Applicant: OLYMPUS CORPORATION, Tokyo (JP)

(72) Inventor: Yasuji Ogata, Akiruno (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 15/850,916

(22) Filed: Dec. 21, 2017

(65) Prior Publication Data
US 2018/0136439 A1 May 17, 2018

Related U.S. Application Data

(62) Division of application No. 15/073,753, filed on Mar. 18, 2016, now Pat. No. 9,885,852.

(30) Foreign Application Priority Data

Mar. 19, 2015 (JP) .................................. 2015-055954

(51) Int. Cl.
| | | |
|---|---|---|
| *G02B 9/12* | (2006.01) | |
| *G03B 17/14* | (2006.01) | |
| *G02B 7/02* | (2006.01) | |
| *G02B 27/00* | (2006.01) | |

(Continued)

(52) U.S. Cl.
CPC .............. *G02B 9/12* (2013.01); *G02B 7/021* (2013.01); *G02B 15/10* (2013.01);
(Continued)

(58) Field of Classification Search
CPC .......... G02B 9/12–9/56; G02B 9/60–64; G03B 17/12; G03B 17/14; G03B 17/565; H04N 5/2252–5/2254
(Continued)

(56) References Cited

U.S. PATENT DOCUMENTS

| | | |
|---|---|---|
| 4,653,877 A | 3/1987 | Hamanishi |
| 8,223,436 B2 | 7/2012 | Sugita et al. |

(Continued)

FOREIGN PATENT DOCUMENTS

| | | |
|---|---|---|
| JP | 4639581 | 12/2010 |
| JP | 5350202 | 8/2013 |
| JP | 5631928 | 10/2014 |

OTHER PUBLICATIONS

English-language translation of Japanese Patent Application No. 4639581, dated Dec. 10, 2010.
(Continued)

*Primary Examiner* — Darryl J Collins
(74) *Attorney, Agent, or Firm* — Scully, Scott, Murphy & Presser, P.C.

(57) ABSTRACT

The present disclosure is directed to a converter lens device that includes a first mount to which a master lens device is capable of being attached, a second mount to which a camera body is capable of being attached and a converter lens having a negative refractive power, wherein, an optical system comprising the converter lens device and the master lens device has a focal length longer than a focal length of an optical system of the master lens device, the converter lens comprises sequentially from an object side, a first lens unit of a positive refractive power, a second lens unit of a negative refractive power, and a third lens unit.

14 Claims, 15 Drawing Sheets

(51) Int. Cl.
  *G03B 17/56*  (2006.01)
  *G02B 15/10*  (2006.01)
(52) U.S. Cl.
  CPC ..... *G02B 27/0018* (2013.01); *G02B 27/0025* (2013.01); *G03B 17/14* (2013.01); *G03B 17/565* (2013.01)
(58) Field of Classification Search
  USPC ............... 359/713–716, 745–748, 754–760, 359/763–769, 771–778, 784–792
  See application file for complete search history.

(56) References Cited

U.S. PATENT DOCUMENTS

| | | |
|---|---|---|
| 9,075,291 B2 | 7/2015 | Ogata |
| 2002/0191303 A1 | 12/2002 | Yamakawa |
| 2005/0225876 A1 | 10/2005 | Nurishi |
| 2011/0080647 A1 | 4/2011 | Sugita et al. |
| 2013/0308034 A1 | 11/2013 | Ogata |
| 2015/0205188 A1 | 7/2015 | Ogata |
| 2016/0274443 A1 | 9/2016 | Ogata |

OTHER PUBLICATIONS

U.S. Office Action dated Jul. 25, 2017 received in U.S. Appl. No. 15/073,753.
U.S. Final Office Action dated Mar. 28, 2017 received in U.S. Appl. No. 15/073,753.
U.S. Office Action dated Oct. 31, 2016 received in U.S. Appl. No. 15/073,753.
Chinese Office Action dated Jan. 4, 2019 received in Chinese Patent Application No. 201510909457.9, together with an English-language translation.

CONVERTER LENS DEVICE AND PHOTOGRAPHING SYSTEM INCLUDING THE SAME

CROSS-REFERENCE TO RELATED APPLICATION

This application is a divisional of U.S. application Ser. No. 15/073,753 filed on Mar. 18, 2016, which is based upon and claims the benefit of priority from the prior Japanese Patent Application No. 2015-055954 filed on Mar. 19, 2015; the entire contents of which are incorporated herein by reference.

BACKGROUND OF THE INVENTION

Field of the Invention

The present invention relates to a converter lens device for an optical system having a focal length longer than a focal length of an optical system of a master lens device, and to a photographing system including such a converter lens device.

Description of the Related Art

A converter lens is known as an optical system for changing the focal length of a master lens. In application, the converter lens is attached to an object side of the master lens or an image side of the master lens. The converter lens attached to the image side of the master lens is called a rear converter lens.

A converter lens device including a rear converter lens includes two mounts. One of the mounts is a mount associated with a mount of a master lens device, and the other mount is a mount associated with a mount of a camera body.

In application of the converter lens device, the converter lens device is disposed between the master lens device and the camera body such that each of the two mounts is interposed between the converter lens device and the master lens device or the camera body. In this manner, the focal length of the master lens can be changed. A rear converter lens for increasing the focal length of a master lens is called a rear teleconverter lens.

The focal length of the master lens can be increased. For this reason, rear teleconverter lenses are used for users of single-lens reflex cameras with interchangeable lenses, especially users who perform telephotographing.

A camera system not using a quick return mirror, that is, a camera system whose size and thickness are reduced by reducing a flange focal distance, has been known. For such a camera system, a rear teleconverter lens is also demanded.

SUMMARY OF THE INVENTION

A converter lens device according to the present invention includes:
a first mount part to which a master lens device is attached;
a second mount part to which a camera body is attached;
a converter lens having a negative refractive power, wherein,
an optical system constituted by the converter lens device and the master lens device has a focal length longer than a focal length of an optical system in the master lens device,
the converter lens includes sequentially from an object side,
a first lens unit having a positive refractive power,
a second lens unit having a negative refractive power, and
a third lens unit, and where
the object side is a side closer to the first mount part, an image side is a side closer to the second mount part.

A photographing system according to the present invention includes:
a master lens device;
a camera body including an image pickup sensor; and
a converter lens device attachable between the master lens device and the camera body,
an optical system, constituted by the master lens device and the converter lens device forms an image of an object,
the image pickup sensor is disposed at an image position of the object and converts an image of the object into an electric signal, and
the converter lens device includes one of the above-described converter lenses.

DETAILED DESCRIPTION OF THE INVENTION

Figure 1:
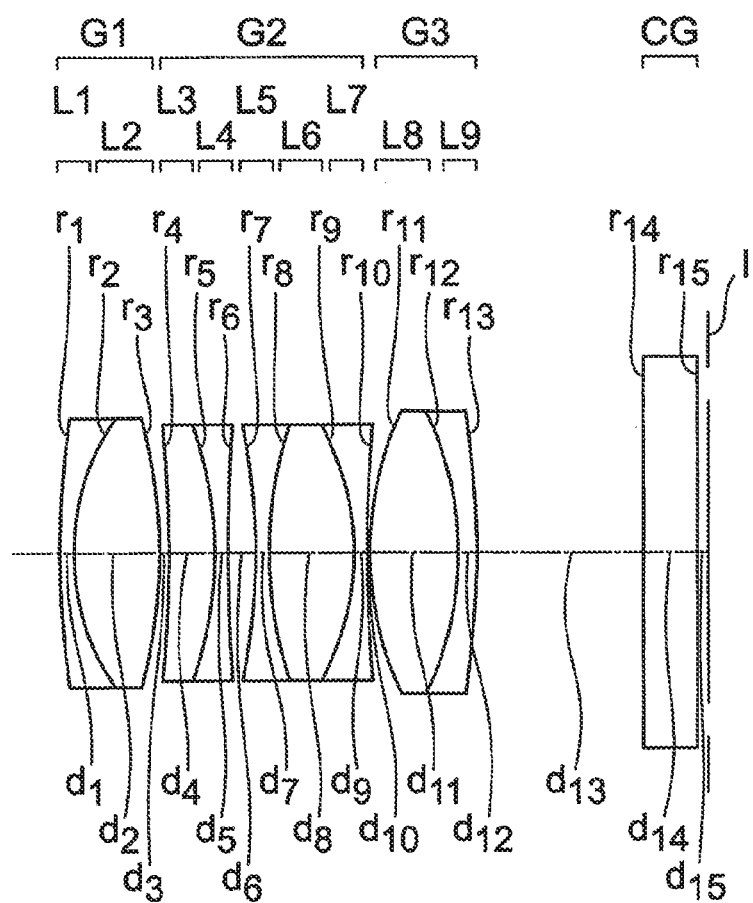
FIG. 1 is a lens cross sectional view of a converter lens according to Example 1.

Prior to description of examples, advantages of an embodiment in an aspect of the present invention will be described. Advantages of the embodiment will be described using specific illustrations. However, similarly to the cases of examples below, the illustrated aspect is merely part of aspects included in the present invention, and there are a large number of variations of the aspect. Thus, the present invention is not limited to the illustrated aspect.

A converter lens according to the present embodiment will be described. In the following description, an object side is a side closer to a first mount, and an image side is a side closer to a second mount. A master lens device can be disposed at the object side, and a camera body can be disposed at the image side.

A converter lens device can include: a first mount to which a master lens device is attached; a second mount to which a camera body is attached; and a converter lens having a negative refractive power. An optical system constituted by the converter lens device and the master lens device can have a focal length longer than a focal length of an optical system in the master lens device. The converter lens can include sequentially from an object side, a first lens unit having a positive refractive power, a second lens unit having a negative refractive power, and a third lens unit.

A converter lens in a converter lens device according to the present embodiment (hereinafter referred to as a "converter lens of the present embodiment") functions as a rear converter lens. Thus, in use, the converter lens device can be sandwiched between a master lens device and a camera body. To obtain this configuration, the converter lens device can include a first mount and a second mount. The first mount can be a mount to which the master lens device is to be attached. The second mount can be a mount to which the camera body is to be attached.

The converter lens of the present embodiment can function as a teleconverter lens. Thus, an optical system constituted by the converter lens device and the master lens device can nave a focal length longer than a local length of an optical system in the master lens device.

The converter lens of the present embodiment can include sequentially from an object side, a first lens unit having a positive refractive power, a second lens unit having a negative refractive power, and a third lens unit. This configuration can enable the first lens unit and the second lens unit to reduce a spherical aberration and a coma aberration.

Since the second lens unit has the negative refractive power, a magnification of the converter lens can be obtained although the converter lens is disposed in a small space between the master lens device and the camera body. The magnification of the converter lens can be 1.4 times or more. The magnification of the converter lens also can be 1.7 times or more or 2.0 times or more.

A converter lens device according to a first embodiment has the basic configuration described above and can satisfy conditional expression (1):

$$0.1 \leq |f|/(\beta \times D) \leq 0.87 \quad (1)$$

wherein
  f is a focal length of the converter lens,
  $\beta$ is a magnification of the converter lens, and
  D is a thickness of the converter lens on an optical axis.

Conditional expression (1) is a conditional expression defining the focal length of the converter lens. The converter lens of the present embodiment is a converter lens applicable to a camera system having a relatively short flange focal distance. Thus, in the converter lens of the present embodiment, the refractive power of each lens unit can be large, and in view of this, aberrations need to be reduced.

However, if the number of lenses is increased in order to reduce aberrations, the total length of the converter lens can increase. In view of this, the converter lens device of the present embodiment is configured to satisfy conditional expression (1), thereby reducing the total length of the converter lens and obtaining a relatively large magnification.

A desired magnification can be obtained by avoiding values above the upper limit of conditional expression (1). Aberrations can be reduced by avoiding values below the lower limit of conditional expression (1).

A converter lens device according to a second embodiment has a similar configuration as the embodiment described above. The second embodiment is in a configuration in which the second lens unit can include sequentially from, the object side, an object side lens sub-unit having a negative refractive power, and an image side lens sub-unit having a negative refractive power, and can satisfy conditional expression (2):

$$1.7 \leq f_{21}/f_{22} \leq 18 \quad (2)$$

where
  $f_{21}$ is a focal length of the object side lens sub-unit, and
  $f_{22}$ is a focal length of the image side lens sub-unit.

In the converter lens device of the present embodiment, the second lens unit can be divided into the object side lens sub-unit and the image side lens sub-unit disposed in this order from the object side, and each of the lens sub-units can have the negative refractive power. With this configuration, even in a configuration in which the second lens unit has a relatively large negative refractive power, the refractive power can be dispersed to the two lens sub-units, and thus, a spherical aberration and a coma aberration occurring in each lens surface in the second lens unit can be reduced with a desired magnification maintained.

Even in a configuration in which the second lens unit has a relatively large refractive power as a whole, the refractive power of the object side lens sub-unit and the refractive power of the image side lens sub-unit do not increase. Thus, effects on eccentricity can be reduced. Specifically, even when eccentricity occurs in a lens during assembly of the object side lens sub-unit, degradation of aberrations can be suppressed. Similar advantages can be obtained for the image side lens sub-unit.

In addition, even when eccentricity occurs between the object side lens sub-unit and the image side lens sub-unit during assembly of the second lens unit, degradation of aberrations in the second lens unit can be suppressed. As described above, since the second lens unit constituted by the two lens sub-units has a relatively large allowance for eccentricity, assembly performance of the second lens unit can be enhanced.

Furthermore, the second lens unit constituted by the two lens sub-units can reduce the refractive power of each surface of lenses constituting the second lens unit. Thus, occurrence of unwanted light such as ghosts can be suppressed. The second lens unit constituted by the two lens sub-units is effective especially for suppressing occurrence of ghosts in the surface of the image side lens sub-unit closest to the image side.

In this manner, the second lens unit constituted by the two lens sub-units can obtain good aberration reduction, enhance assembly performance of the optical system, and suppress occurrence of ghosts.

The converter lens device of the present embodiment can satisfy conditional expression (2) described above.

An excessive increase in the refractive power of the image side lens sub-unit can be prevented by avoiding values above the upper limit of conditional expression (2). In this manner, reduction of advantages obtained by the second lens unit constituted by the two lens sub-units can be prevented.

An excessive increase in the refractive power of the object side lens sub-unit can also be prevented by avoiding values below the lower limit of conditional expression (2). In this manner, reduction of advantages obtained by approaching the principal point toward the object side can be prevented. In this case, since the refractive power of the converter lens does not increase, aberrations can be reduced with a limited number of lenses.

A converter lens device according to a third embodiment has configuration similar configuration to the embodiments described above. The third embodiment is in a configuration in which the second lens unit can include sequentially from the object side, an object side lens sub-unit having a negative refractive power, and an image side lens sub-unit having a negative refractive power, and each of the object side lens sub-unit and the image side lens sub-unit can include a cemented lens, and can satisfy conditional expression (2'):

$$0.6 \leq f_{21}/f_{22} \leq 10 \quad (2')$$

where $f_{21}$ is a focal length of the object side lens sub-unit, and
$f_{22}$ is a focal length of the image side lens sub-unit.

As described above, the second lens unit constituted by the two lens sub-units can reduce a spherical aberration and a coma aberration occurring in each lens surface in the second lens unit, can reduce influences on eccentricity (enhance assembly performance of the optical system), and can suppress occurrence of ghosts.

In particular, in a configuration in which the second lens unit has a large negative refractive power, it can be difficult to accurately determine the relative position with the first lens unit, and thus, difficulty in assembly can increase. In addition, since a coma aberration is reduced the first lens unit and the second lens unit, occurrence of an error in determining the relative position can lead to deterioration of performance of a peripheral portion. In view of this, the second lens unit can be divided into the object side lens sub-unit and the image side lens sub-unit.

Furthermore, since the refractive power of each lens surface can be reduced, the second lens unit constituted by the two lens sub-units can be also advantageous for reducing occurrence of unwanted light such as ghosts. The second lens unit constituted by the two lens sub-units can be effective for suppressing occurrence of ghosts in the surface of the image side lens sub-unit closest to the image side.

Moreover, since the object side lens sub-unit can include the cemented lens, differences in a spherical aberration and a coma aberration depending on the wavelength can be reduced. In addition, since the image side lens sub-unit can include the cemented lens, processability and assembly performance of the image side lens sub-unit can be enhanced.

The converter lens device of the present embodiment can satisfy conditional expression (2') described above. Technical significance of conditional expression (2') can be similar to that of conditional expression (2).

A converter lens device according to a fourth embodiment can have a similar configuration as those embodiments described above. The fourth embodiment is of a configuration in which the second lens unit can include sequentially from, the object side, an object side lens sub-unit having a negative refractive power, and an image side lens sub-unit having a negative refractive power, each of the object side lens sub-unit and the image side lens sub-unit can include a cemented lens, and a surface of the object side lens sub-unit closest to the object side and a surface of the image side lens sub-unit closest to the object side can be both concave surfaces and can be both concave towards the object side.

In the configuration described above, a negative spherical aberration occurring in the first lens unit can be reduced with a positive spherical aberration occurring in the second lens unit. Here, the shape of a surface of the second lens unit closest to the object side can contribute to a positive spherical aberration occurring in the second lens unit. In a case where the second lens unit is constituted by the object side lens sub-unit and the image side lens sub-unit, the surface of the second lens unit closest to the object side can correspond to a surface of the object side lens sub-unit closest to the object side.

In view of this, both the surface of the object side lens sub-unit closest to the object side and the surface of the image side lens sub-unit closest to the object side can have their concave surfaces facing the object side. In this manner, a positive spherical aberration occurring in the second lens unit can be dispersed in the two surfaces. Thus, it is possible to prevent an excessive increase in the amount of a positive spherical aberration occurring in the second lens unit while maintaining a desired magnification.

As described above, a negative spherical aberration can occur in the first lens unit. In view of this, a positive spherical aberration occurring in the second lens unit can be dispersed so that the positive spherical aberration in an amount necessary for reducing a negative spherical aberration can be generated in the second lens unit.

In addition, since the surface of the object side lens sub-unit closest to the object side and the surface of the image side lens sub-unit closest to the object side have their concave surfaces facing the object side, aberrations, especially a spherical aberration and a chromatic aberration, occurring in each lens surface can be reduced, thereby enabling good aberration reduction. Furthermore, influences on eccentricity can be reduced, thereby obtaining good assembly performance.

A converter lens device according to a fifth embodiment has a similar configuration as the embodiments described above. The fifth embodiment is of a configuration in which the second lens unit can include sequentially from, the object side, an object side lens sub-unit having a negative refractive power, and an image side lens sub-unit having a negative refractive power, a surface of the object side lens sub-unit closest to the object side can have its concave surface facing the object side, and the image side lens sub-unit can include a cemented lens composed of three lenses.

As described above, since the image side lens sub-unit can include the cemented lens, processability and assembly performance of the image side lens sub-unit can be enhanced. In addition, since the cemented lens is composed of three lenses, aberrations can be reduced. To reduce aberrations, the cemented lens can be composed of three lenses of a negative lens, a positive lens, and a negative lens.

A converter lens device according to a sixth embodiment has a similar configuration as the embodiments described above. The sixth embodiment is of a configuration in which the second lens unit can include sequentially from the object side, an object side lens sub-unit having a negative refractive power, and an image side lens sub-unit having a negative refractive power, and the image side lens sub-unit can include a cemented lens composed of three lenses, and can satisfy conditional expression (4):

$$-2.0 \leq (r_{21f}+r_{21r})/(r_{21f}-r_{21r}) \leq 2.0 \qquad (4)$$

where $r_{21f}$ is a radius of curvature of a surface of the object side lens sub-unit closest to the object side, and $r_{21r}$ is a radius of curvature of a surface of the object side lens sub-unit closest to the image side.

As described above, since the image side lens sub-unit can include the cemented lens composed of the three lenses, processability and assembly performance of the image side lens sub-unit can be enhanced, and aberrations can be reduced.

Conditional expression (4) is a conditional expression with respect to the shape of the object side lens sub-unit. Aberrations can be reduced by avoiding values above the upper limit of conditional expression (4) or values below the lower limit thereof.

A converter lens device according to a seventh embodiment has a similar configuration as those described above. The seventh embodiment is of a configuration in which the second lens unit can include sequentially from the object side, an object side lens sub-unit having a negative refractive power, and an image side lens sub-unit having a negative refractive power, the object side lens sub-unit can include a cemented lens, and the third lens unit can include a cemented lens.

As described above, since the object side lens sub-unit can include the cemented lens, differences in a spherical aberration and a coma aberration depending on the wavelength can be reduced.

Since the third lens unit can include the cemented lens, occurrence of a magnification chromatic aberration can be suppressed. In a case where the cemented lens of the third lens unit is composed of the positive lens and the negative lens, the incident angle of off-axis rays at the interface can be reduced. Consequently, the magnification chromatic aberration can be reduced. The cemented lens of the third lens unit composed of the positive lens and the negative lens can be advantageous for reducing the magnification chromatic aberration.

A converter lens device according to an eighth embodiment has a similar configuration as those embodiments described above. The eighth embodiment is of a configuration in which the first lens unit can include a cemented lens, the second lens unit can include sequentially from the object side, an object side lens sub-unit having a negative refractive power, and an image side lens sub-unit having a negative refractive power, and the image side lens sub-unit can include a cemented lens.

Since the first lens unit can include the cemented lens, a chromatic aberration can be reduced.

The cemented lens of the first lens unit may be composed of a negative lens and a positive lens. Then, the incident angle of axial rays at the interface can be reduced. Consequently, the difference in a spherical aberration depending on the wavelength can be reduced.

A converter lens device according to a ninth embodiment has a similar configuration as those embodiments described above. The ninth embodiment is of a configuration in which the second lens unit can include sequentially from the object side, an object side lens sub-unit having a negative refractive power, and an image side lens sub-unit having a negative refractive power, and the image side lens sub-unit can include a cemented lens, and can satisfy conditional expression (8):

$$-2.4 \leq f_3/f \leq -0.75 \qquad (8')$$

where $f_3$ is a focal length of the third lens unit, and f is a focal length of the converter lens.

As described above, since the image side lens sub-unit can include the cemented lens, processability and assembly performance of the image side lens sub-unit can be enhanced.

An excessive increase in the refractive power of the third lens unit can be prevented by avoiding values above the upper limit of conditional expression (8). In this case, the necessity of increasing the refractive power of the second lens unit can be avoided and the occurrence of aberrations can be suppressed.

An excessive increase in the emergence angle of off-axis rays (principal rays) emitted from, the third lens unit is reduced by avoiding values below the lower limit of conditional expression (8). In view of this, the incident angle of rays incident on the image pickup sensor can be set at an angle satisfying incidence characteristics of the image pickup sensor.

A converter lens device according to a tenth embodiment has a similar configuration as those embodiments described above. The tenth embodiment is of a configuration in which the first lens unit can include a cemented lens, and the second lens unit can include sequentially from the object side, an object side lens sub-unit having a negative refractive power, and an image side lens sub-unit having a negative refractive power, and can satisfy conditional expression (8'):

$$-2.4 \leq f_3/f \leq -1.0 \qquad (8')$$

wherein $f_3$ is a focal length of the third lens unit, and f is a focal length of the converter lens.

As described above, since the first lens unit can include the cemented lens, a chromatic aberration can be reduced. Technical significance of conditional expression (8') is similar to that of conditional expression (8).

In addition, the converter lens devices of the first through tenth embodiments (hereinafter collectively referred to as a "converter lens device of the present embodiment") can satisfy conditional expression (1) described above.

In the converter lens device of the present embodiment, the second lens unit can include sequentially from the object side, an object side lens sub-unit having a negative refractive power, and an image side lens sub-unit having a negative refractive power, and conditional expression (2) or (2') described above can be satisfied.

The converter lens device of the present embodiment can satisfy conditional expression (3):

$$0.3 \leq f_{23}/f \leq 0.9 \qquad (3)$$

wherein $f_{23}$ is a composite focal length of the second lens unit and the third lens unit, and f is a focal length of the converter lens.

Since the composite focal length of the second lens unit and the third lens unit has a negative value, a composite refractive power of the second lens unit and the third lens unit is a negative refractive power. In this case, the principal point of the converter lens can approach the object side. Thus, the refractive power of the converter lens can be maintained. Consequently, good aberration reduction can be achieved with a small number of lenses.

An increase in the total length of the converter lens can be prevented by avoiding values above the upper limit of conditional expression (3). An increase in the refractive power of the converter lens can be prevented by avoiding values below the lower limit of conditional expression (3). Consequently, degradation of a spherical aberration and an increase in the number of lenses can be suppressed.

In addition, in the converter lens device of the present embodiment, the second lens unit can include an object side lens sub-unit having a negative refractive power, and the converter lens device can satisfy conditional expression (4):

$$-2.0 \leq (r_{21f} + r_{21r})/(r_{21f} - r_{21r}) \leq 2.0 \quad (4)$$

where $r_{21f}$ is a radius of curvature of a surface of the object side lens sub-unit closest to the object side, and $r_{21r}$ is a radius of curvature of a surface of the object side lens sub-unit closest to the image side.

In the converter lens device of the present embodiment, the second lens unit can include an image side lens sub-unit having a negative refractive power, and the converter lens device can satisfy conditional expression (5):

$$-2.0 \leq (r_{22f} + r_{22r})/(r_{22f} - r_{22r}) \leq 0 \quad (5)$$

wherein $r_{22f}$ is a radius of curvature of a surface of the image side lens sub-unit closest to the object side, and $r_{22r}$ is a radius of curvature of a surface of the image side lens sub-unit closest to the image side.

Conditional expression (5) is a conditional expression with respect to the shape of the image side lens sub-unit. Good aberration reduction can be obtained by avoiding values above the upper limit of conditional expression (5) or values below the lower limit thereof.

By avoiding values above the upper limit of conditional expression (5), occurrence of ghosts in the surface of the image side lens sub-unit closest to the image side can be suppressed. Thus, values above the upper limit of conditional expression (5) can be avoided.

In the converter lens device of the present embodiment, the second lens unit can include an image side lens sub-unit having a negative refractive power, and the converter lens device can satisfy conditional expression (6):

$$1.75 \leq nd_{22N} \leq 2.00 \quad (6)$$

where $nd_{22N}$ is an average value of refractive indexes on a d line in a negative lens included in the image side lens sub-unit.

Conditional expression (6) is a conditional expression with respect to refractive indexes of a negative lens included in the image side lens sub-unit. In the image side lens sub-unit, the height of axial rays is relatively low. In a configuration in which the negative lens included in the image side lens sub-unit has a large refractive power, degradation of curvature of field can be prevented by appropriately setting the values of refractive indexes of the negative lens.

The degradation of curvature of field can be prevented by avoiding values below the lower limit of conditional expression (6). Thus, values below the lower-limit of conditional expression (6) can be avoided. An increase in cost of a glass material can be prevented by avoiding values above the upper limit of conditional expression (6). Thus, values above the upper limit of conditional expression (6) can be avoided.

In the converter lens device of the present embodiment, the second lens unit can include an image side lens sub-unit having a negative refractive power, and the converter lens device can satisfy conditional expression (7):

$$25 \leq vd_{22N} \leq 50 \quad (7)$$

where $vd_{22N}$ is an average value of Abbe numbers with respect to a d line of a negative lens included in the image side lens sub-unit.

Conditional expression (7) is a conditional expression with respect to Abbe numbers of the negative lens included in the image side lens sub-unit. Since each negative lens included in the image side lens sub-unit has a large refractive power, degradation of a chromatic aberration can occur unless the values of Abbe numbers of the negative lens are not appropriately set.

Degradation of a chromatic aberration can be prevented by avoiding values below the lower limit of conditional expression (7). Thus, it is possible to avoid values below the lower limit of conditional expression (7). An excessive decrease in the refractive index can be prevented by avoiding values above the upper limit of conditional expression (7). Thus, a generally available glass material can be used. Consequently, both the curvature of field and the chromatic aberration can be reduced.

In the converter lens device of the present embodiment, the second lens unit can include sequentially from the object side, an object side lens sub-unit having a negative refractive power and an image side lens sub-unit.

The second lens unit constituted by the two lens sub-units can obtain good aberration reduction, enhance assembly performance of the optical system, and suppress occurrence of ghosts.

In the converter lens device of the present embodiment, the second lens unit can include sequentially from the object side, an object side lens sub-unit and an image side lens sub-unit having a negative refractive power.

The second lens unit constituted by the two lens sub-units can obtain good aberration reduction, enhance assembly performance of the optical system, and suppress occurrence of ghosts.

In the converter lens device of the present embodiment, the second lens unit can include an object side lens sub-unit having a negative refractive power, and a surface of the object side lens sub-unit closest to the object side can have its concave surface facing the object side.

In this manner, occurrence of a spherical aberration in the first lens unit and the second lens unit can be suppressed.

In the converter lens device of the present embodiment, the second lens unit can include an image side lens sub-unit having a negative refractive power, and a surface of the image side lens sub-unit closest to the object side can have its concave surface facing the object side.

In this manner, occurrence of a spherical aberration in the first lens unit and the second lens unit can be suppressed.

In the converter lens device of the present embodiment, the second lens unit can include an object side lens sub-unit having a negative refractive power, and the object side lens sub-unit can include a cemented lens.

In this manner, differences in a spherical aberration and a coma aberration depending on the wavelength can be reduced.

In the converter lens device of the present embodiment, the second lens unit can include an image side lens sub-unit having a negative refractive power, and the image side lens sub-unit can include a cemented lens.

In this manner, processability and assembly performance of the image side lens sub-unit can be enhanced.

In the converter lens device of the present embodiment, the second lens unit can include an image side lens sub-unit having a negative refractive power, and the image side lens sub-unit can include a cemented lens composed of three lenses.

In this manner, processability and assembly performance of the image side lens sub-unit can be enhanced, and aberrations can be reduced.

In the converter lens device of the present embodiment, the first lens unit can include a cemented lens.

In this manner, a chromatic aberration can be reduced.

In the converter lens device of the present embodiment, the third lens unit can have a positive refractive power.

In the configuration in which the converter lens is constituted by the first lens unit having the positive refractive power, the second lens unit having the negative refractive power, and the third lens unit having the positive refractive power, a spherical aberration and a coma aberration can be reduced with the first lens unit and the second lens unit, and distortion can be reduced with the second lens unit and the third lens unit. The positive refractive power of the third lens unit can prevent an excessive increase in the emergence angle of off-axis rays (principal rays) emitted from the converter lens. Thus, the incident angle of rays incident on the image pickup sensor disposed close to the image surface can be reduced.

The converter lens device of the present embodiment can satisfy conditional expression (8):

$$-2.4 \leq f_3/f \leq -0.75 \tag{8}$$

where
$f_3$ is a focal length of the third lens unit, and
f is a focal length of the converter lens.

In the converter lens device of the present embodiment, the third lens unit can include a cemented lens.

In this manner, occurrence of a magnification chromatic aberration can be suppressed.

In the converter lens device of the present embodiment, the first lens unit can include a negative meniscus lens whose convex surface faces the object side and a biconvex positive lens.

In this manner, a chromatic aberration that can occur in the first lens unit can be reduced. The use of the biconvex positive lens can obtain an appropriate incident angle of rays incident on each lens surface.

In the converter lens device of the present embodiment, the third lens unit can include a biconvex positive lens and a negative meniscus lens whose convex surface faces the image side.

In this manner, the incident angle of off-axis rays can be reduced, and thus, occurrence of aberrations can be suppressed.

The converter lens device of the present embodiment can satisfy conditional expression (9):

$$-5.0 \leq f_1/f_{23} \leq -1.0 \tag{9}$$

where
$f_1$ is a focal length of the first lens unit, and
$f_{23}$ is a composite focal length of the second lens unit and the third lens unit.

A telecentric optical system obtains an advantage in which principal rays emitted from the optical system are parallel to the optical axis. By avoiding values above the upper limit of conditional expression (9), advantages in the telecentric optical system can be sufficiently obtained with the converter lens of the present embodiment, and an increase in the total length of the optical system, can be suppressed.

An increase in occurrence of aberrations in the second lens unit and the third lens unit can be suppressed by avoiding values below the lower limit of conditional expression (9).

The converter lens device of the present embodiment can satisfy conditional expression (10):

$$-3.0 \leq f_1/f \leq -1.0 \tag{10}$$

wherein
$f_1$ is a focal length of the first lens unit, and
f is a focal length of the converter lens.

An increase in occurrence of aberrations in the first lens unit can be suppressed by avoiding values above the upper limit of conditional expression (10). An increase in the outer diameter of the converter lens can be suppressed by avoiding values below the lower limit of conditional expression (10).

The converter lens device of the present embodiment can satisfy conditional expression (11):

$$0.2 \leq f_2/f \leq 0.6 \tag{11}$$

wherein
$f_2$ is a focal length of the second lens unit, and
f is a focal length of the converter lens.

An increase in the total length of the optical system can be suppressed by avoiding values above the upper limit of conditional expression (11). An increase in occurrence of aberrations in the second lens unit can be suppressed by avoiding values below the lower limit of conditional expression (11).

In the converter lens device of the present embodiment, the negative refractive power of the image side lens sub-unit can be larger than the negative refractive power of the object side lens sub-unit.

In this manner, the principal point of the converter lens can be disposed close to the object side. Consequently, the refractive power of the converter lens can be reduced, and thus, aberrations can be reduced. The increase in the negative refractive power of the image side lens sub-unit can be also advantageous in view of aberration reduction.

A photographing system according to the present embodiment can include: a master lens device; a camera body including an image pickup sensor; and a converter lens device attachable between the master lens device and the camera body. In the photographing system, an optical system constituted by the master lens device and the converter lens device forms an image of an object, the image pickup sensor is disposed at an image position of the object and converts an image of the object into an electric signal, and the converter lens device can include one of the above-described converter lenses.

In the photographing system according to the present embodiment, a new camera system having a relatively short flange focal distance can also acquire a high-quality image with a sufficient magnification.

A plurality of the abovementioned arrangements can be simultaneously satisfied interactively. In this manner, a high-quality optical system can be acquired. Combinations of some aspects of examples are changeable. Regarding each conditional expression, restricting one of the lower limit value and the upper limit value, or both, can be done.

For conditional expression (1), the lower limit value can be 0.22, 0.30, 0.34 or 0.45. Moreover, for conditional expression (1), the upper limit value can be 0.82, 0.78, 0.75 or 0.73.

For conditional expression (2), the lower limit value can be 1.950. Moreover, for conditional expression (2), the upper limit value can be 14.63, 11.26, 10.0, or 7.89.

For conditional expression (2'), the lower limit value can be 1.05, 1.5, 1.7 or 1.95. Moreover, for conditional expression (2'), the upper limit value can be 7.89, 7.0, 6.0, or 5.0.

For conditional expression (3), the lower limit value can be 0.37, 0.43, or 0.50. Moreover, for conditional expression (3), the upper limit value can be 0.84, 0.79, or 0.73.

For conditional expression (4), the lower limit value can be −1.63, −1.26, or −0.89. Moreover, for conditional expression (4), the upper limit value can be 1.61, 1.23, or 0.84.

For conditional expression (5), the lower limit value can be −1.80, −1.59, or −1.39. Moreover, for conditional expression (5), the upper limit value can be −0.081, −0.16, or −0.24.

For conditional expression (6), the lower limit value can be 1.77, 1.80, or 1.82. Moreover, for conditional expression (6), the upper limit value can be 1.97, 1.94, or 1.91.

For conditional expression (7), the lower limit value can be 26.5, 27.9, or 29.4. Moreover, for conditional expression (7), the upper limit value can be 48.4, 46.8, or 45.3.

For conditional expression (8), the lower limit value can be −2.3, −2.2, or −2.0. Moreover, for conditional expression (8), the upper limit value can be −0.84, −0.93, or −1.0.

For conditional expression (8'), the lower limit value can be −2.3, −2.2, or −2.0. Moreover, for conditional expression (8'), the upper limit value can be −1.0.

For conditional expression (9), the lower limit value can be −4.6, −4,2, or −3.8. Moreover, for conditional expression (9), the upper limit value can be −1.4, −1.8, or −2.2.

For conditional expression (10), the lower limit value can be −2.8, −2.6, or −2.5. Moreover, for conditional expression (10), the upper limit value can be −1.1, −1.3, or −1.4.

For conditional expression (11), the lower limit value can be 0.23, 0.27, or 0.30. Moreover, for conditional expression (11), the upper limit value can be 0.57, 0.55, or 0.52.

Examples of converter lens according to certain aspects of the present invention will be described below in detail by referring to the accompanying diagrams. However, the present invention is not restricted to the examples described below.

Next, converter lens according to examples from an example 1 to an example 6 will be described below. FIG. 1 to FIG. 6 are lens cross-sectional views. Moreover, a first lens unit is denoted by G1, a second lens unit is denoted by G2, a third lens unit is denoted by G3, and an image plane (image pickup surface) is denoted by I.

A flat and parallel plate which forms a low-pass filter or a cover glass of an electronic image pickup sensor may be disposed between the third lens unit and the image plane I. A wavelength region restricting coating which restricts infrared light may be applied to a surface of the flat and parallel plate. Moreover, a multilayer film for restricting wavelength region may be applied to a surface of the cover glass. The cover glass may be imparted an effect of a low-pass filter. In each example, a cover glass CG can be disposed.

In each examples, an image plane I denotes an image plane in combination of a master lens and a converter lens. An image pickup sensor can be disposed at image plane I.

FIG. 1 is a lens cross sectional view of a converter lens according to example 1. The converter lens can include sequentially from an object side, a first lens unit G1 having a positive refractive power, a second lens unit G2 having a negative refractive power, and a third lens unit G3 having a positive refractive power.

The first lens unit G1 can include a negative meniscus lens L1 having a convex surface facing the object side, a biconvex positive lens L2. Here, the negative meniscus lens L1 and the biconvex positive lens L2 are cemented.

The second lens unit G2 can include a positive meniscus lens L3 having a convex surface facing the image side, a biconcave negative lens L4, a biconcave negative lens L5, a biconvex positive lens L6, and a biconcave negative lens L7. Here, the positive meniscus lens L3 and the biconcave negative lens L4 are cemented. The biconcave negative lens L5, the biconvex positive lens and the biconcave negative lens L7 are cemented.

The second lens unit G2 can include an object side lens sub-unit having a negative refractive power and an image side lens sub-unit having a negative refractive power. The object side lens sub-unit can include the positive meniscus lens L3 and the biconcave negative lens L4. The image side lens sub-unit can include the biconcave negative lens L5, the biconvex positive lens L6, and the biconcave negative lens L7.

The third lens unit G3 can include a biconvex positive lens L8, a negative meniscus lens L9 having a convex surface facing the image side. Here, the biconvex positive lens L8 and the negative meniscus lens L9 are cemented.

Figure 2:
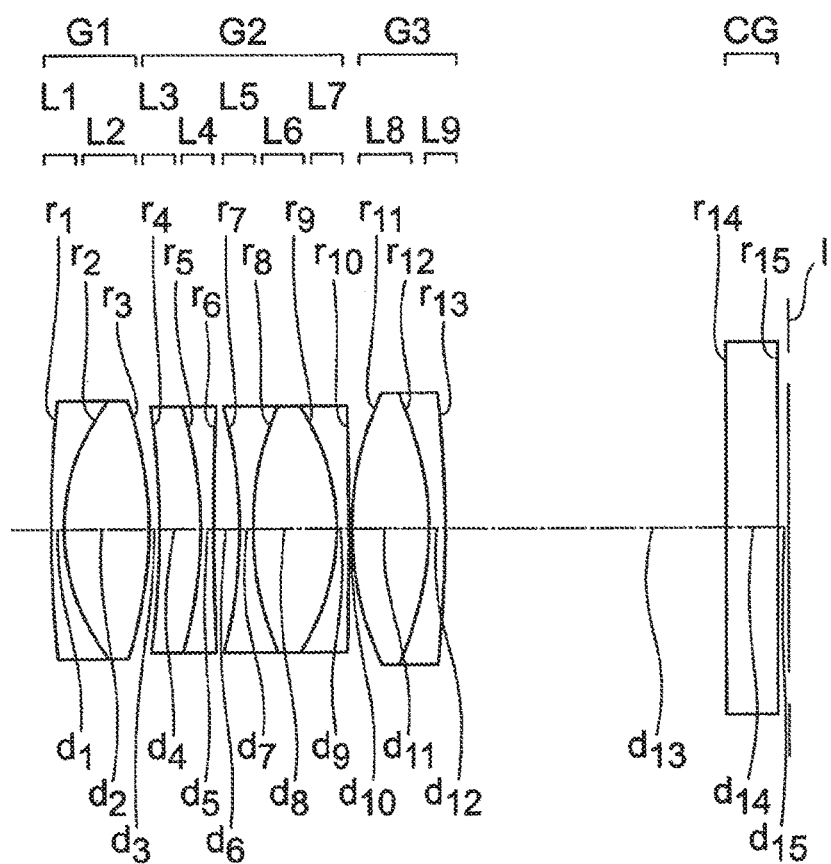
FIG. 2 is a lens cross sectional view of a converter lens according to Example 2.

FIG. 2 is a lens cross sectional view of a converter lens according to example 2. The converter lens can include sequentially from an object side, a first lens unit G1 having a positive refractive power, a second lens unit G2 having a negative refractive power, and a third lens unit G3 having a positive refractive power.

The first lens unit G1 can include a negative meniscus lens L1 having a convex surface facing the object side, a biconvex positive lens L2. Here, the negative meniscus lens L1 and the biconvex positive lens L2 are cemented.

The second lens unit G2 can include a positive meniscus lens L3 having a convex surface facing the image side, a biconcave negative lens L4, a biconcave negative lens L5, a biconvex positive lens L6, and a negative meniscus lens L7 having a convex surface facing the image side. Here, the positive meniscus lens L3 and the biconcave negative lens L4 are cemented. The biconcave negative lens L5, the biconvex positive lens L6 and the negative meniscus lens L7 are cemented.

The second lens unit G2 can include an object side lens sub-unit having a negative refractive power and an image side lens sub-unit having a negative refractive power. The object side lens sub-unit can include the positive meniscus lens L3 and the biconcave negative lens L4. The image side lens sub-unit can include the biconcave negative lens L5, the biconvex positive lens L6, and the negative meniscus lens L7.

The third lens unit G3 can include a biconvex positive lens L8, a negative meniscus lens L9 having a convex surface facing the image side. Here, the biconvex positive lens L8 and the negative meniscus lens L9 are cemented.

Figure 3:
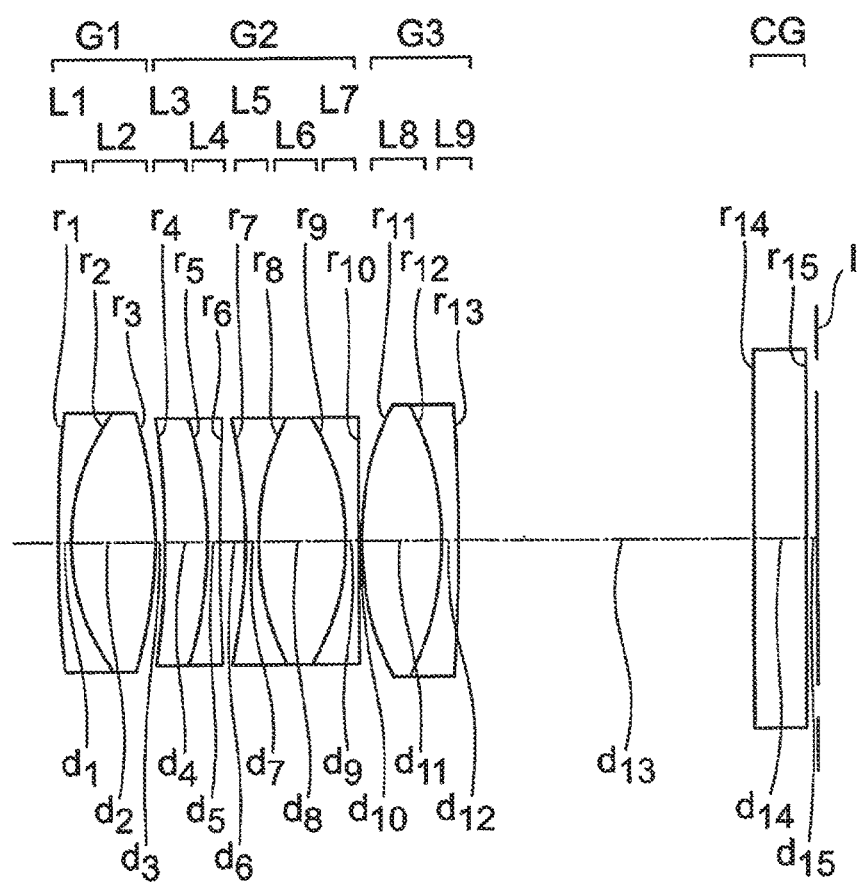
FIG. 3 is a lens cross sectional view of a converter lens according to Example 3.

FIG. 3 is a lens cross sectional view of a converter lens according to example 3. The converter lens can include sequentially from an object side, a first lens unit G1 having a positive refractive power, a second lens unit G2 having a negative refractive power, and a third lens unit G3 having a positive refractive power.

The first lens unit G1 can include a negative meniscus lens L1 having a convex surface facing the object side, a biconvex positive lens L2. Here, the negative meniscus lens L1 and the biconvex positive lens L2 are cemented.

The second lens unit G2 can include a positive meniscus lens L3 having a convex surface facing the image side, a biconcave negative lens L4, a biconcave negative lens L5, a biconvex positive lens L6, and a negative meniscus lens L7 having a convex surface facing the image side. Here, the positive meniscus lens L3 and the biconcave negative lens L4 are cemented. The biconcave negative lens L5, the biconvex positive lens L6 and the negative meniscus lens L7 are cemented.

The second lens unit G2 can include an object side lens sub-unit having a negative refractive power and an image side lens sub-unit having a negative refractive power. The object side lens sub-unit can include the positive meniscus lens L3 and the biconcave negative lens L4. The image side lens sub-unit can include the biconcave negative lens L5, the biconvex positive lens L6, and the negative meniscus lens L7.

The third lens unit G3 can include a biconvex positive lens L8, a negative meniscus lens L9 having a convex surface facing the image side. Here, the biconvex positive lens L8 and the negative meniscus lens L9 are cemented.

Figure 4:
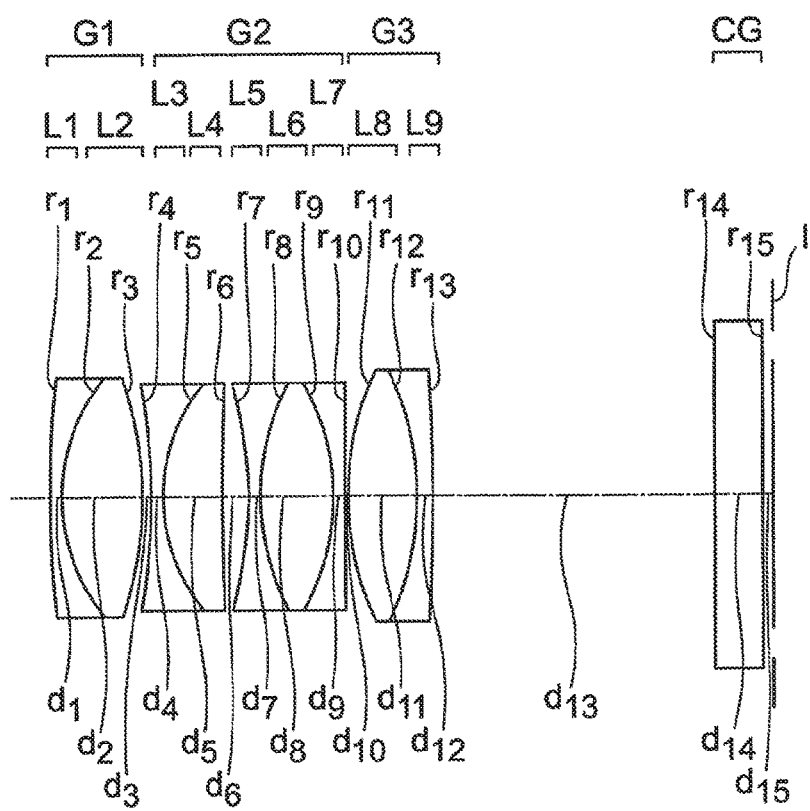
FIG. 4 is a lens cross sectional view of a converter lens according to Example 4.

FIG. 4 is a lens cross sectional view of a converter lens according to example 4. The converter lens can include sequentially from an object side, a first lens unit G1 having a positive refractive power, a second lens unit G2 having a negative refractive power, and a third lens unit G3 having a positive refractive power.

The first lens unit G1 can include a negative meniscus lens L1 having a convex surface facing the object side, a biconvex positive lens L2. Here, the negative meniscus lens L1 and the biconvex positive lens L2 are cemented.

The second lens unit G2 can include a biconcave negative lens L3, a positive meniscus lens L4 having a convex surface facing the object side, a biconcave negative lens L5, a biconvex positive lens L6, and a negative meniscus lens L7 having a convex surface facing the image side. Here, the biconcave negative lens L3 and the positive meniscus lens L4 are cemented. The biconcave negative lens L5, the biconvex positive lens L6 and the negative meniscus lens L7 are cemented.

The second lens unit G2 can include an object side lens sub-unit having a negative refractive power and an image side lens sub-unit having a negative refractive power. The object side lens sub-unit can include the biconcave negative lens L3 and the positive meniscus lens L4. The image side lens sub-unit can include the biconcave negative lens L5, the biconvex positive lens L6, and the negative meniscus lens L7.

The third lens unit G3 can include a biconvex positive lens L8, a negative meniscus lens L9 having a convex surface facing the image side. Here, the biconvex positive lens L8 and the negative meniscus lens L9 are cemented.

Figure 5:
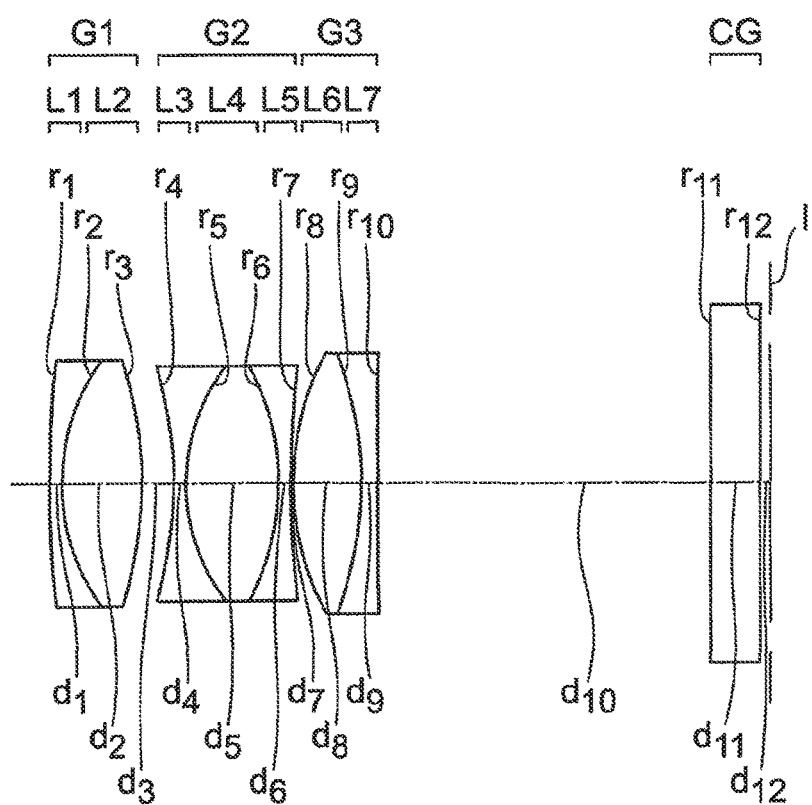
FIG. 5 is a lens cross sectional view of a converter lens according to Example 5.

FIG. 5 is a lens cross sectional view of a converter lens according to example 5. The converter lens can include sequentially from an object side, a first lens unit G1 having a positive refractive power, a second lens unit G2 having a negative refractive power, and a third lens unit G3 having a positive refractive power.

The first lens unit G1 can include a negative meniscus lens L1 having a convex surface facing the object side, a biconvex positive lens L2. Here, the negative meniscus lens L1 and the biconvex positive lens L2 are cemented.

The second lens unit G2 can include a biconcave negative lens L3, a biconvex positive lens L4, and a biconcave negative lens L5. Here, the biconcave negative lens L3 and the biconvex positive lens L4 are cemented.

The second lens unit G2 can include an image side lens sub-unit having a negative refractive power. The image side lens sub-unit can include the biconcave negative lens L3, the biconvex positive lens L4, and the biconcave negative lens L5.

The third lens unit G3 can include a biconvex positive lens L6, and a biconcave negative lens L7. Here, the biconvex positive lens L6 and the biconcave negative lens L7 are cemented.

Figure 6:
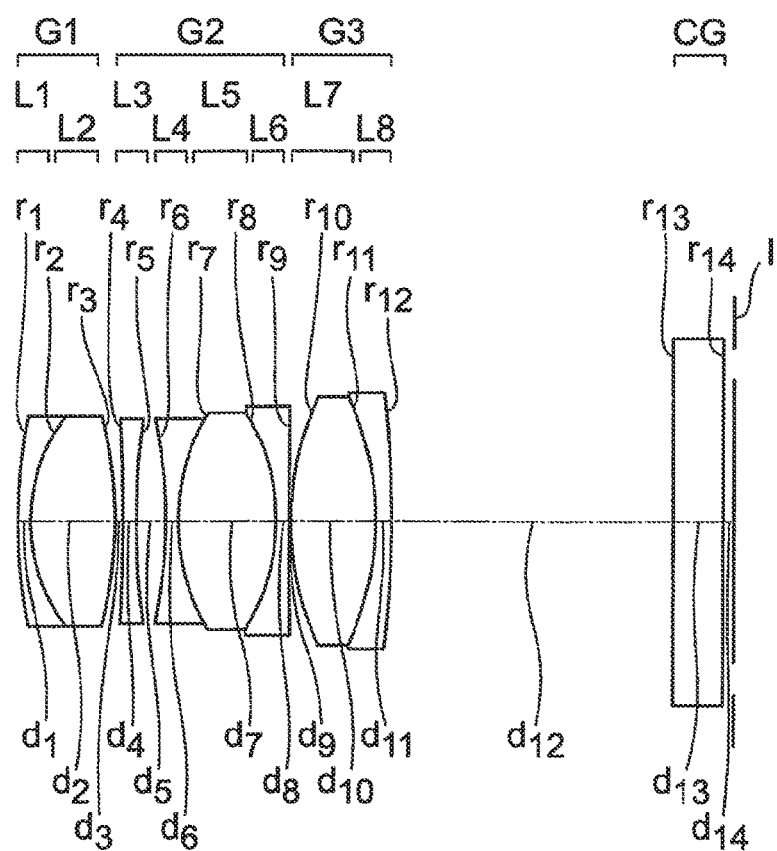
FIG. 6 is a lens cross sectional view of a converter lens according to Example 6.
Figure 7:
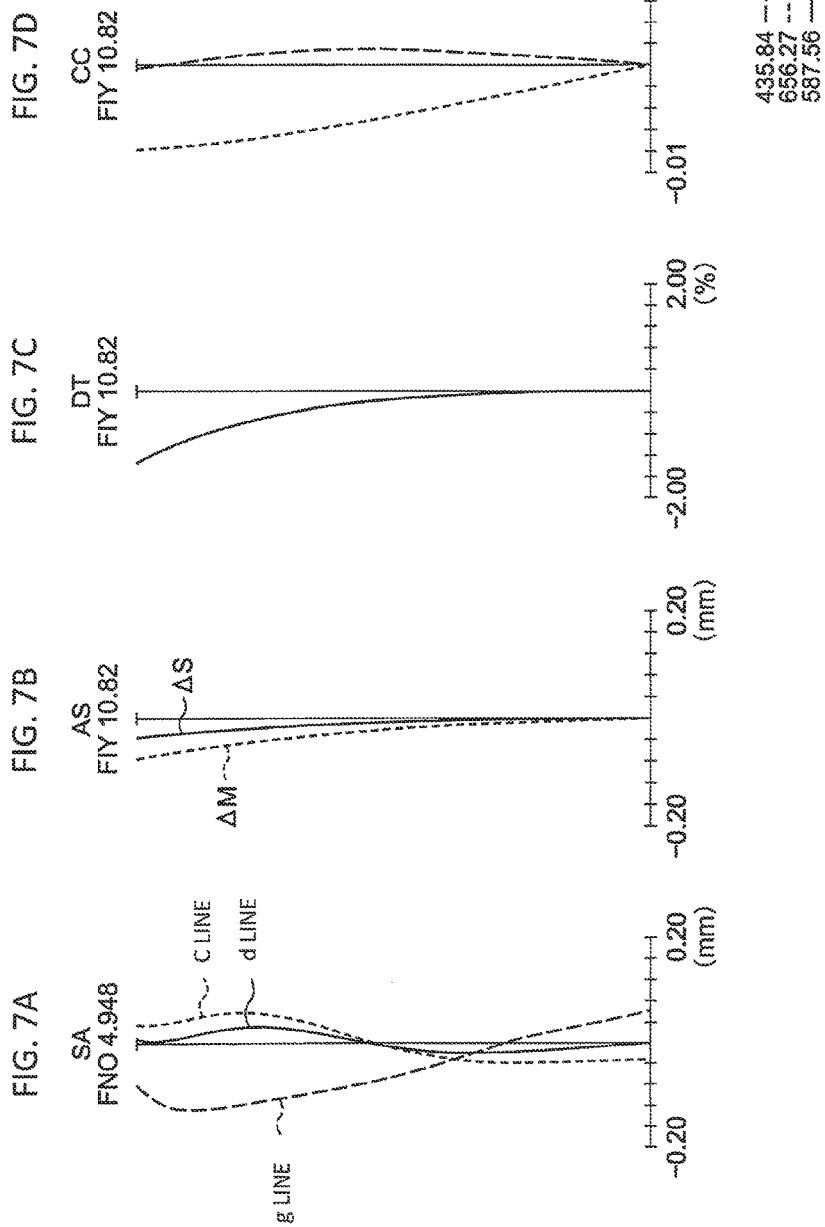
FIG. 7A, FIG. 7B, FIG. 7C, and FIG. 7D show aberrations of the converter lens according to Example 1, specifically a spherical aberration (SA), an astigmatism (AS), a distortion (DT), and a magnification chromatic aberration (CC).
Figure 8:
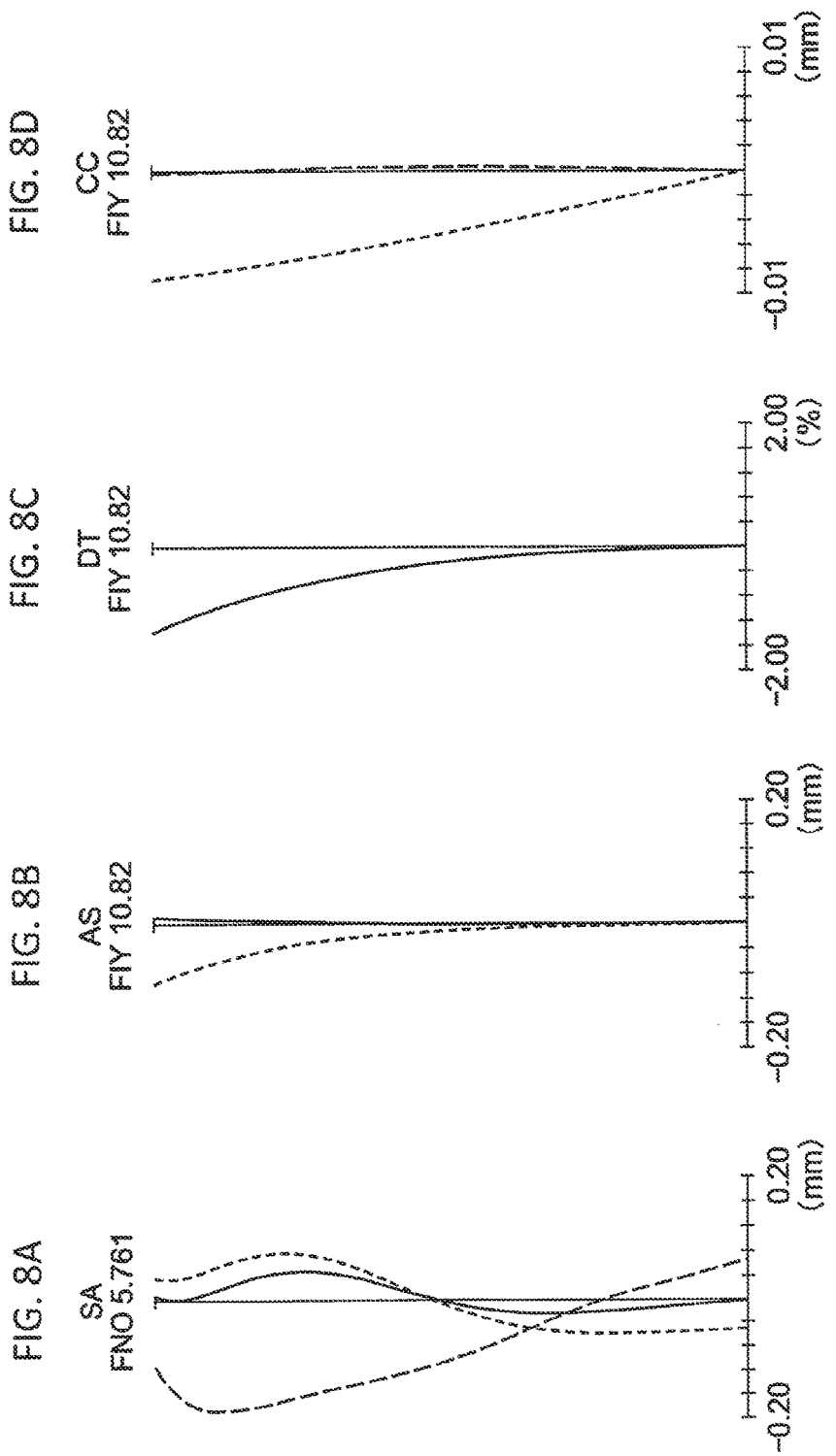
FIG. 8A, FIG. 8B, FIG. 8C, and FIG. 8D show aberrations of the converter lens according to Example 2, specifically a spherical aberration (SA), an astigmatism (AS), a distortion (DT), and a magnification chromatic aberration (CC).
Figure 9:
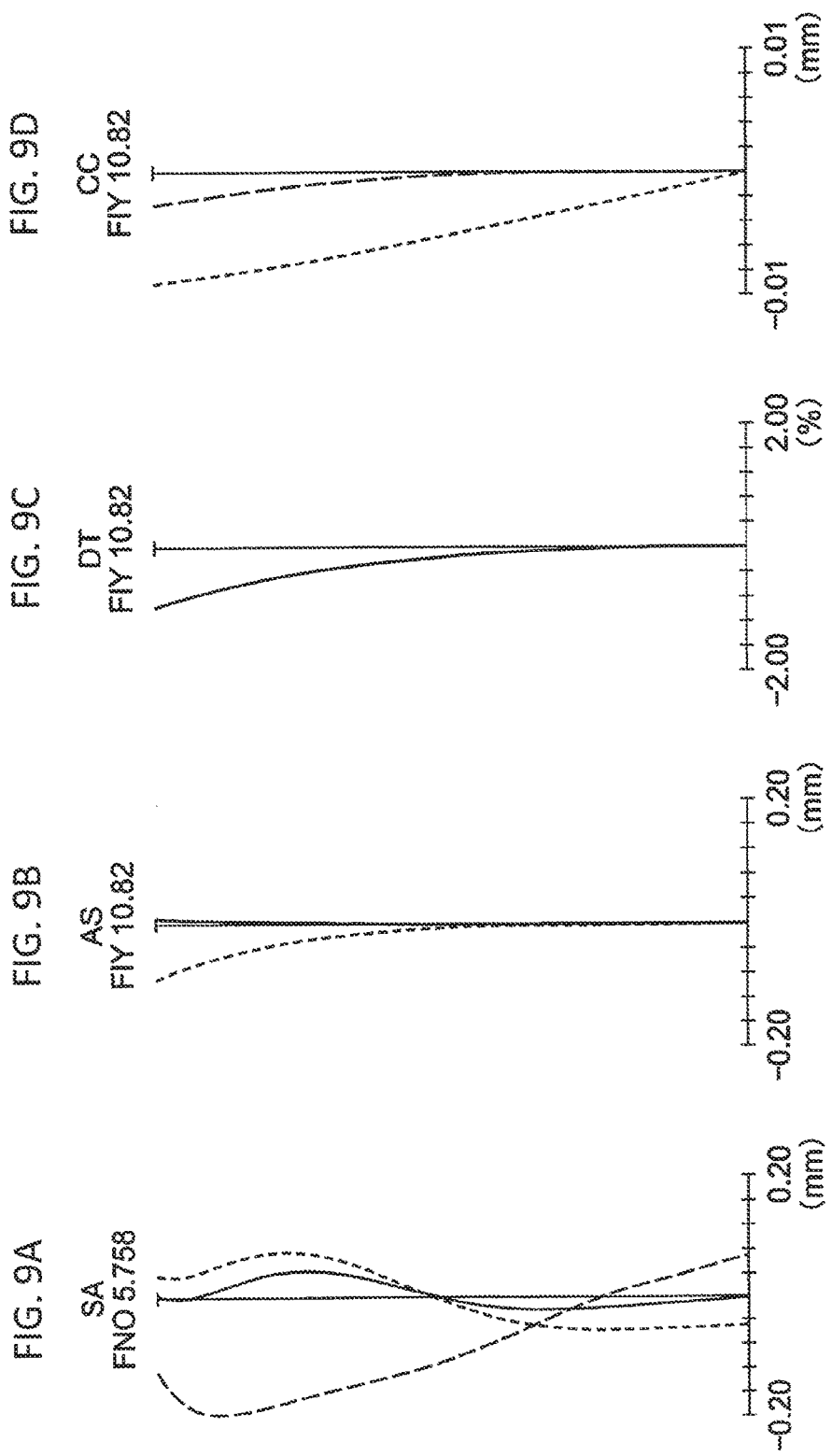
FIG. 9A, FIG. 9B, FIG. 9C, and FIG. 9D show aberrations of the converter lens according to Example 3, specifically a spherical aberration (SA), an astigmatism (AS), a distortion (DT), and a magnification chromatic aberration (CC).
Figure 10:
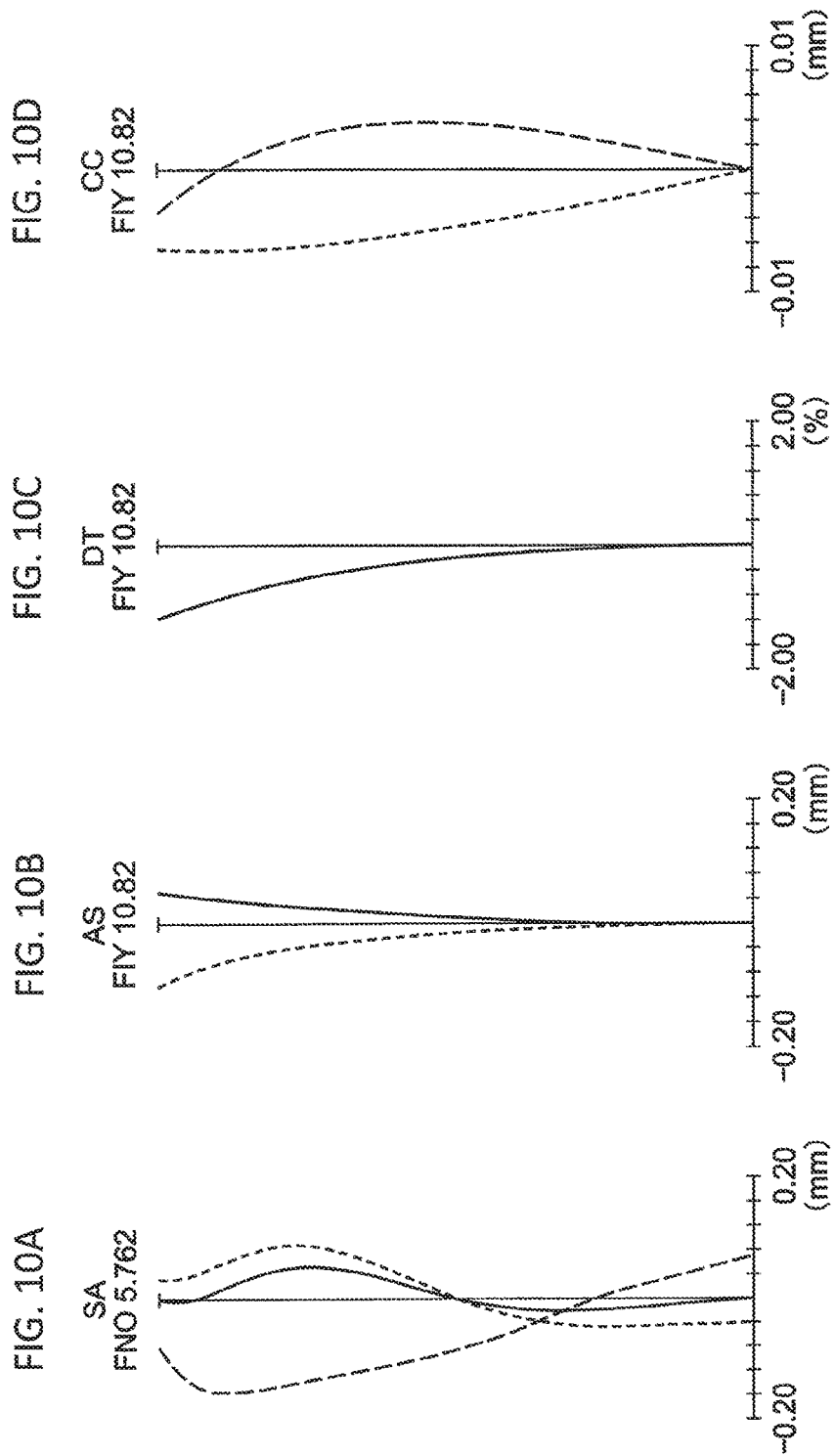
FIG. 10A, FIG. 10B, FIG. 10C, and FIG. 10D show aberrations of the converter lens according to Example 4, specifically a spherical aberration (SA), an astigmatism (AS), a distortion (DT), and a magnification chromatic aberration (CC).
Figure 11:
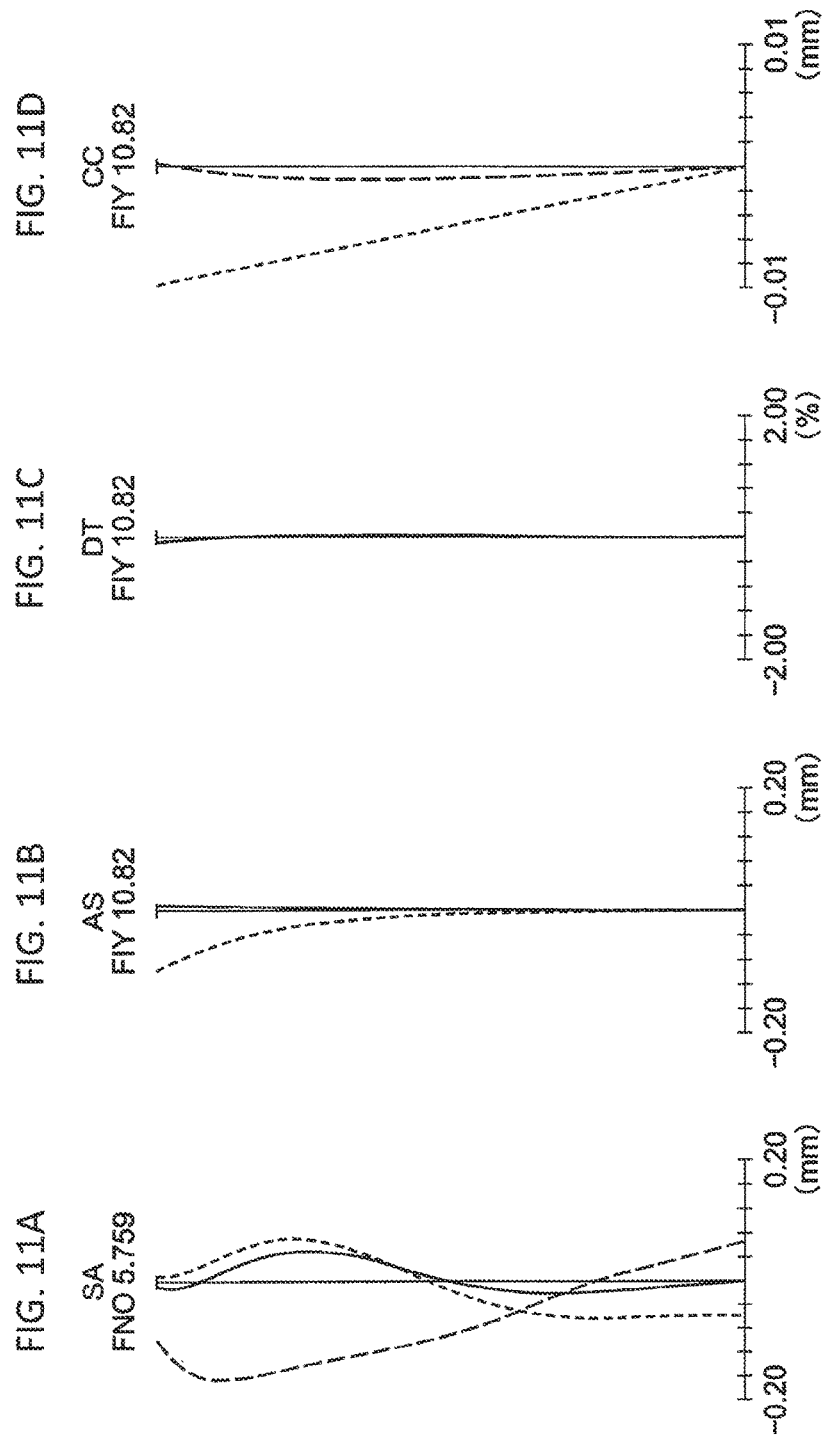
FIG. 11A, FIG. 11B, FIG. 11C, and FIG. 11D show aberrations of the converter lens according to Example 5, specifically a spherical aberration (SA), an astigmatism (AS), a distortion (DT), and a magnification chromatic aberration (CC).
Figure 12:
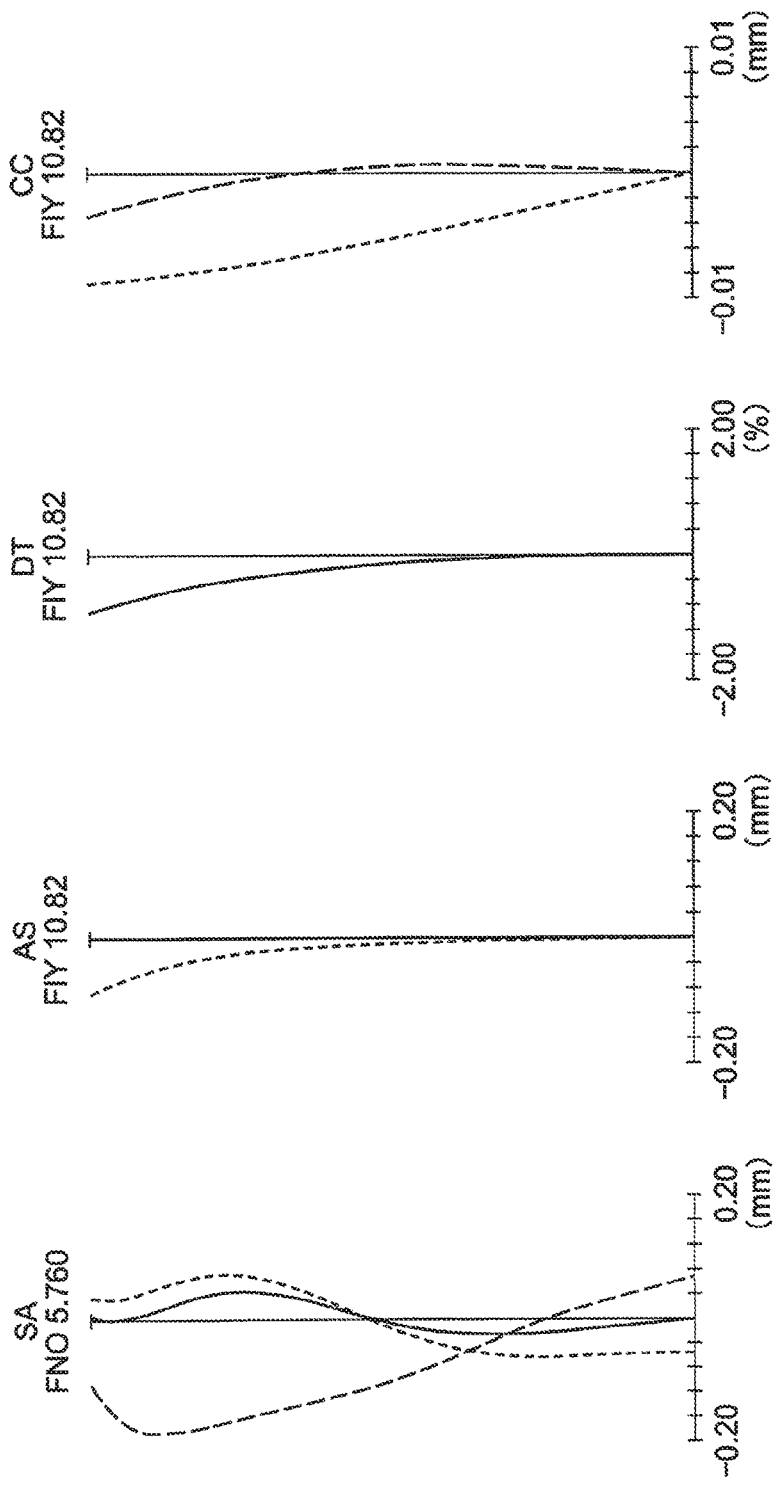
FIG. 12A, FIG. 12B, FIG. 12C, and FIG. 12D show aberrations of the converter lens according to Example 6, specifically a spherical aberration (SA), an astigmatism (AS), a distortion (DT), and a magnification chromatic aberration (CC).

FIG. 6 is a lens cross sectional view of a converter lens according to example 6. The converter lens can include sequentially from an object side, a first lens unit G1 having a positive refractive power, a second lens unit G2 having a negative refractive power, and a third lens unit G3 having a positive refractive power.

The first lens unit G1 can include a negative meniscus lens L1 having a convex surface facing the object side, a biconvex positive lens L2. Here, the negative meniscus lens L1 and the biconvex positive lens L2 are cemented.

The second lens unit G2 can include a biconcave negative lens L3, a biconcave negative lens L4, a biconvex positive lens L5, and a biconcave negative lens L6. Here, the biconcave negative lens L4, the biconvex positive lens L5, and the biconcave negative lens L6 are cemented.

The second lens unit G2 can include an object side lens sub-unit having a negative refractive power and an image side lens sub-unit having a negative refractive power. The object side lens sub-unit can include the biconcave negative lens L3. The image side lens sub-unit can include the biconcave negative lens L4, the biconvex positive lens L5, and the biconcave negative lens L6.

The third lens unit G3 can include a biconvex positive lens L7, and a negative meniscus lens L8 having a convex surface facing the image side. Here, the biconvex positive lens L7 and the negative meniscus lens L8 are cemented.

Figure 13:
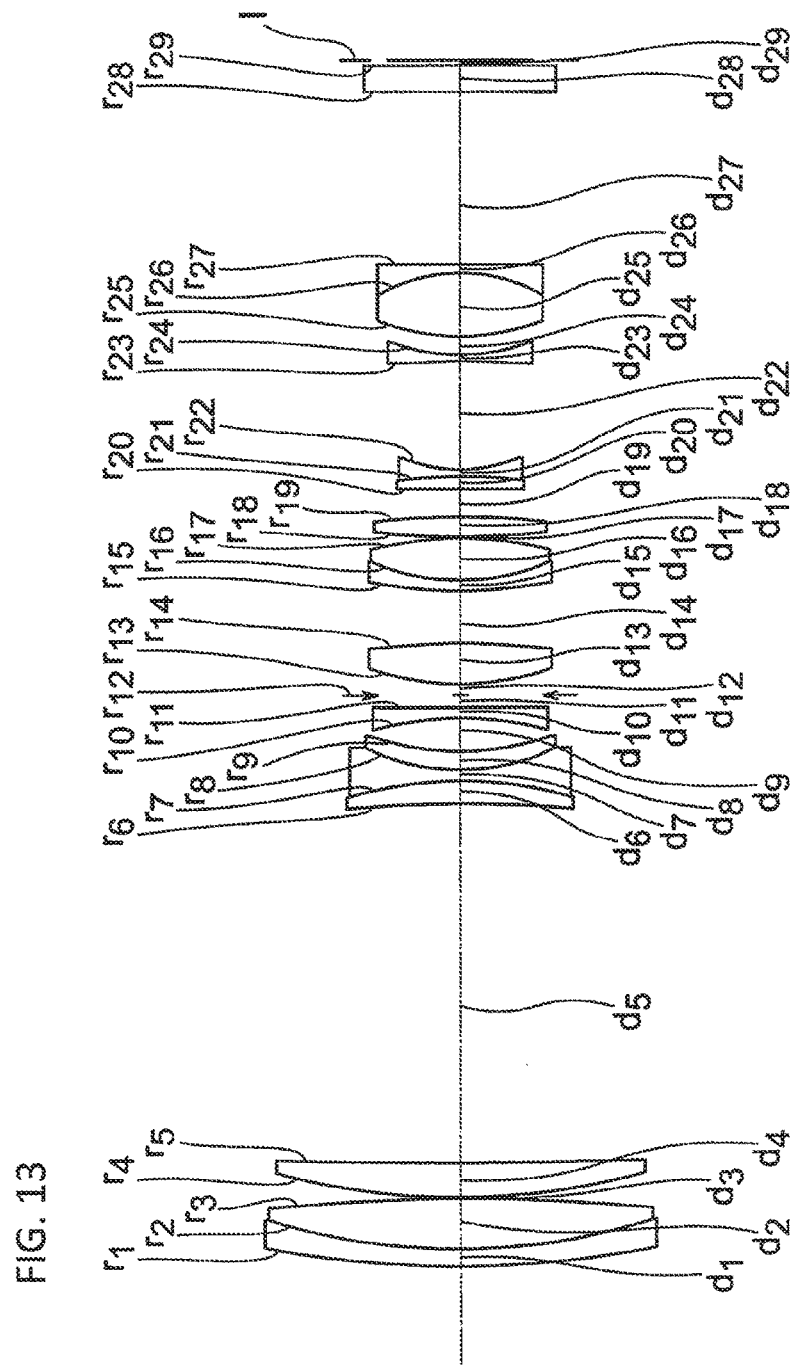
FIG. 13 is a lens cross sectional view of a master lens.

Next, an example of a master lens is described. FIG. 13 is a lens cross sectional view of the master lens.

As described in the FIG. 13, the master lens can include sequentially from the object side, a cemented lens including a negative meniscus lens having a convex surface facing the object side and a biconvex positive lens, a positive meniscus lens having a convex surface facing the object side, a positive meniscus lens having convex surface facing the image side, a cemented lens including a biconcave negative lens and a positive meniscus lens having a convex surface facing the object side, a biconcave negative lens, an aperture stop, a biconvex positive lens, a cemented lens including a negative meniscus lens having a convex surface facing the object side and a biconvex positive lens, a biconvex positive lens, a cemented lens including a biconvex positive lens and a biconcave negative lens, a biconcave negative lens, a cemented lens including a biconvex positive lens and a plano-concave negative lens.

Figure 14:
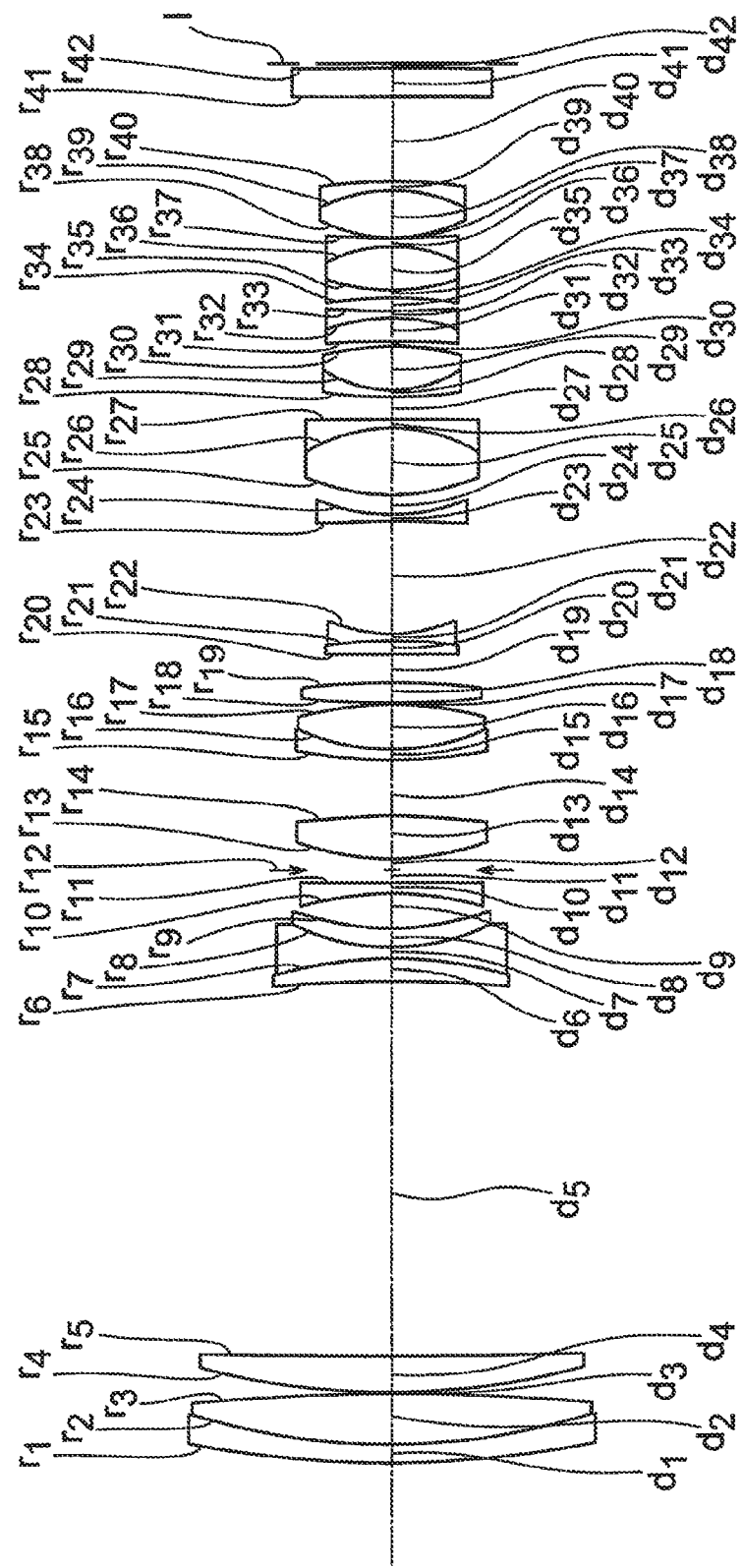
FIG. 14 is a lens cross sectional view showing a combination of a master lens and a converter lens.

FIG. 14 is a lens cross sectional view of incorporation the converter lens with the master lens. In FIG. 14, the converter lens of example 1 is used. In FIG. 14, the lenses from r1 through r27 are the master lens and the lenses from r28 through r40 are the converter lens.

Set out below are a variety of numeral data (surface data, etc.) about the examples. The surface data includes the radius of curvature r and surface separation d of each lens surface (optical surface) for each surface number, the d-line (587.6 nm) refractive index nd of each lens (optical medium), and the d-line Abbe constant vd of each lens (optical medium). Various data include focal lengths f, F-numbers (FNO), angles of view $2\omega°$, back focuses BF (in air), total lengths (in air), magnification $\beta$, and image heights IH. Note here that BF is a distance from the final lens surface to the image plane as calculated on an air basis. The total length is defined as the sum of the back focus and a distance from a forefront lens surface to a last lens surface. These various data are the data in the case of incorporation the converter lens with the master lens.

EXAMPLE 1

A converter lens of embodiment 1 is discussed in this example.

Unit mm

Surface data

| Surface no. | r | d | nd | νd |
|---|---|---|---|---|
| 1 | 65.1918 | 1.0000 | 1.88300 | 40.76 |
| 2 | 17.2989 | 6.3400 | 1.67270 | 32.10 |
| 3 | −41.2599 | 0.7400 | | |
| 4 | −112.3560 | 3.4900 | 1.59270 | 35.31 |
| 5 | −28.4752 | 1.0000 | 1.88300 | 40.76 |
| 6 | 130.5475 | 2.0000 | | |
| 7 | −50.9966 | 1.0000 | 1.88300 | 40.76 |
| 8 | 29.0155 | 6.4100 | 1.59270 | 35.31 |
| 9 | −19.7607 | 1.0000 | 1.88300 | 40.76 |
| 10 | 99.9691 | 0.2000 | | |
| 11 | 23.7389 | 6.7300 | 1.59270 | 35.31 |
| 12 | −23.7389 | 1.3900 | 1.92286 | 18.90 |
| 13 | −67.9266 | 12.3234 | | |
| 14 | ∞ | 4.0000 | 1.51633 | 64.14 |
| 15 | ∞ | 0.8000 | | |
| Image plane | | | | |

Distance between the master lens and the converter lens:

3.2632

Various data (infinite)

| f | 249.93 |
|---|---|
| FNO. | 4.95 |
| 2ω | 5.03° |
| IH | 10.82 |
| β | 1.70 |
| BF (in air) | 15.76 |
| Total length (in air) | 200.72 |

EXAMPLE 2

Unit mm

Surface data

| Surface no. | r | d | nd | νd |
|---|---|---|---|---|
| 1 | 84.7892 | 1.0000 | 1.83481 | 42.73 |
| 2 | 15.8489 | 6.6200 | 1.59270 | 35.31 |
| 3 | −32.3018 | 0.8000 | | |
| 4 | −71.3421 | 3.1300 | 1.59270 | 35.31 |
| 5 | −35.0798 | 1.0000 | 1.72916 | 54.68 |
| 6 | 160.6126 | 2.0800 | | |
| 7 | −40.0219 | 1.0000 | 1.81600 | 46.62 |
| 8 | 23.6378 | 6.5200 | 1.59270 | 35.31 |
| 9 | −17.2941 | 1.0000 | 1.88300 | 40.76 |
| 10 | −475.2016 | 0.2000 | | |
| 11 | 24.1647 | 6.1000 | 1.59270 | 35.31 |
| 12 | −24.1647 | 1.3000 | 1.92286 | 20.88 |
| 13 | −109.0509 | 21.7191 | | |
| 14 | ∞ | 4.0000 | 1.51633 | 64.14 |
| 15 | ∞ | 0.8000 | | |
| Image plane | | | | |

Distance between the master lens and the converter lens:

2.2632

Various data (infinite)

| f | 294.03 |
|---|---|
| FNO. | 5.76 |
| 2ω | 4.27° |
| IH | 10.82 |
| β | 2.00 |
| BF (in air) | 25.16 |
| Total length (in air) | 208.57 |

EXAMPLE 3

Unit mm

Surface data

| Surface no. | r | d | nd | νd |
|---|---|---|---|---|
| 1 | 87.2894 | 1.0000 | 1.83481 | 42.73 |
| 2 | 17.1399 | 6.4100 | 1.59270 | 35.31 |
| 3 | −35.4760 | 0.7600 | | |
| 4 | −73.2984 | 3.1800 | 1.59270 | 35.31 |
| 5 | −33.9580 | 1.0000 | 1.59282 | 68.63 |
| 6 | 204.4691 | 1.9500 | | |
| 7 | −46.5721 | 1.0000 | 1.88300 | 40.76 |
| 8 | 21.4391 | 6.6800 | 1.59270 | 35.31 |
| 9 | −18.6368 | 1.0000 | 1.88300 | 40.76 |
| 10 | −1885.0868 | 0.2000 | | |
| 11 | 23.4145 | 6.2700 | 1.59270 | 35.31 |
| 12 | −23.4145 | 1.3000 | 1.92119 | 23.96 |
| 13 | −158.1720 | 22.5769 | | |
| 14 | ∞ | 4.0000 | 1.51633 | 64.14 |
| 15 | ∞ | 0.8000 | | |
| Image plane | | | | |

Distance between the master lens and the converter lens:

1.2632

Various data (infinite)

| f | 293.86 |
|---|---|
| FNO. | 5.76 |
| 2ω | 4.26° |
| IH | 10.82 |
| β | 2.00 |
| BF (in air) | 26.01 |
| Total length (in air) | 208.43 |

EXAMPLE 4

Unit mm

Surface data

| Surface no. | r | d | nd | νd |
|---|---|---|---|---|
| 1 | 92.3720 | 1.0000 | 1.83481 | 42.71 |
| 2 | 15.8334 | 6.7500 | 1.59270 | 35.31 |
| 3 | −30.7777 | 0.7100 | | |
| 4 | −58.6451 | 1.0000 | 1.74100 | 52.64 |
| 5 | 14.8334 | 4.9300 | 1.78472 | 25.68 |
| 6 | 189.0857 | 2.1600 | | |
| 7 | −34.7689 | 1.0000 | 1.92286 | 18.90 |

-continued

Unit mm

| | | | | |
|---|---|---|---|---|
| 8 | 20.3359 | 6.1200 | 1.67270 | 32.10 |
| 9 | -19.0496 | 1.0000 | 1.83481 | 42.71 |
| 10 | -3918.8699 | 0.2000 | | |
| 11 | 24.1623 | 5.8900 | 1.59270 | 35.31 |
| 12 | -24.1623 | 1.3000 | 1.83481 | 42.71 |
| 13 | -172.4865 | 23.4353 | | |
| 14 | ∞ | 4.0000 | 1.51633 | 64.14 |
| 15 | ∞ | 0.8000 | | |
| Image plane | | | | |

Distance between the master lens and the converter lens:

1.2632

Various data (infinite)

| | |
|---|---|
| f | 294.06 |
| FNO. | 5.76 |
| 2ω | 4.27° |
| IH | 10.82 |
| β | 2.00 |
| BF (in air) | 26.87 |
| Total length (in air) | 210.59 |

EXAMPLE 5

Unit mm

Surface data

| Surface no. | r | d | nd | vd |
|---|---|---|---|---|
| 1 | 110.5546 | 1.0000 | 1.83481 | 42.73 |
| 2 | 17.1310 | 6.5900 | 1.57501 | 41.50 |
| 3 | -29.7379 | 2.4600 | | |
| 4 | -34.3494 | 1.0000 | 1.88300 | 40.76 |
| 5 | 15.6142 | 7.4300 | 1.76182 | 26.52 |
| 6 | -20.6672 | 1.0000 | 1.88300 | 40.76 |
| 7 | 72.5300 | 0.2000 | | |
| 8 | 21.8102 | 5.5900 | 1.59270 | 35.31 |
| 9 | -28.6544 | 1.3000 | 1.92286 | 18.90 |
| 10 | 325.8668 | 26.9757 | | |
| 11 | ∞ | 4.0000 | 1.51633 | 64.14 |
| 12 | ∞ | 0.8000 | | |
| Image plane | | | | |

Distance between the master lens and the converter lens:

1.2632

Various data (infinite)

| | |
|---|---|
| f | 293.95 |
| FNO. | 5.76 |
| 2ω | 4.22° |
| IH | 10.82 |
| β | 2.00 |
| BF (in air) | 30.41 |
| Total length (in air) | 208.65 |

EXAMPLE 6

Unit mm

Surface data

| Surface no. | r | d | nd | vd |
|---|---|---|---|---|
| 1 | 40.8655 | 1.0000 | 1.83481 | 42.73 |
| 2 | 14.0063 | 6.6400 | 1.59270 | 35.31 |
| 3 | -37.6568 | 0.6600 | | |
| 4 | -148.0741 | 1.0000 | 1.83481 | 42.73 |
| 5 | 55.0766 | 2.3300 | | |
| 6 | -39.9517 | 1.0000 | 1.88300 | 40.76 |
| 7 | 16.8494 | 7.6500 | 1.67270 | 32.10 |
| 8 | -16.8494 | 1.0000 | 1.88300 | 40.76 |
| 9 | 307.7075 | 0.2000 | | |
| 10 | 23.5892 | 6.7900 | 1.59270 | 35.31 |
| 11 | -23.5892 | 1.3000 | 1.92286 | 20.88 |
| 12 | -96.1183 | 22.0470 | | |
| 13 | ∞ | 4.0000 | 1.51633 | 64.14 |
| 14 | ∞ | 0.8000 | | |
| Image plane | | | | |

Distance between the master lens and the converter lens:

2.2632

Various data (infinite)

| | |
|---|---|
| f | 293.99 |
| FNO. | 5.76 |
| 2ω | 4.25° |
| IH | 10.82 |
| β | 2.00 |
| BF (in air) | 25.49 |
| Total length (in air) | 207.72 |

Example of Master Lens

Unit mm

Surface data

| Surface no. | r | d | nd | vd |
|---|---|---|---|---|
| 1 | 137.0268 | 2.6000 | 1.78470 | 26.29 |
| 2 | 86.6508 | 7.7600 | 1.49700 | 81.61 |
| 3 | -321.6069 | 0.1500 | | |
| 4 | 96.8154 | 5.2600 | 1.43875 | 94.93 |
| 5 | 624.2467 | 53.8789 | | |
| 6 | -227.2066 | 3.3700 | 1.80810 | 22.76 |
| 7 | -59.4074 | 1.6000 | 1.48749 | 70.23 |
| 8 | 30.8341 | 2.7500 | 1.80000 | 29.84 |
| 9 | 39.2048 | 4.9900 | | |
| 10 | -49.6375 | 1.5000 | 1.83481 | 42.73 |
| 11 | 458.1191 | 1.9122 | | |
| 12 (Stop) | ∞ | 1.8000 | | |
| 13* | 39.4392 | 5.7600 | 1.49700 | 81.61 |
| 14* | -87.6954 | 7.9800 | | |
| 15 | 70.3121 | 1.5000 | 1.84666 | 23.78 |
| 16 | 32.8253 | 6.5800 | 1.59282 | 68.63 |
| 17 | -51.5148 | 0.1500 | | |
| 18 | 129.4168 | 3.1000 | 1.49700 | 81.61 |
| 19 | -94.0670 | 3.8905 | | |
| 20 | 789.7458 | 2.0000 | 1.92286 | 18.90 |
| 21 | -86.5458 | 1.0000 | 1.74320 | 49.29 |
| 22* | 21.6608 | 16.1946 | | |
| 23 | -356.0768 | 1.0000 | 1.62004 | 36.26 |
| 24 | 28.8000 | 2.7919 | | |
| 25* | 31.6086 | 9.5800 | 1.80610 | 40.88 |

-continued

Unit mm

| 26 | −24.0000 | 1.3000 | 1.64769 | 33.79 |
|---|---|---|---|---|
| 27 | ∞ | 26.0632 | | |
| 28 | ∞ | 4.0000 | 1.51633 | 64.14 |
| 29 | ∞ | 0.8000 | | |
| Image plane | | | | |

Aspherical surface data

13th surface k = 0
A4 = −3.1251E−06, A6 = −3.8756E−10, A8 = 5.5927E−11,
A10 = −1.4099E−13

14th surface k = 0
A4 = 1.0047E−05, A6 = −3.0390E−10, A8 = 5.4533E−11,
A10 = −1.3296E−13

22th surface k = −0.0326
A4 = −2.5854E−06, A6 = 2.4119E−09, A8 = −7.1028E−11,
A10 = 1.4991E−13

25th surface k = −0.7171
A4 = 7.9298E−07, A6 = −2.8322E−09, A8 = 2.5344E−12,
A10 = 0.0000E+00

Various data (infinite)

| f | 147.00 |
|---|---|
| FNO. | 2.88 |
| 2ω | 8.30° |
| IH | 10.82 |
| BF (in air) | 29.50 |
| Total length (in air) | 179.90 |

Aberration diagrams according to the examples from the example 1 to the example 6 are shown in diagrams from FIG. 7A to FIG. 12D. These aberration diagrams are the aberration diagrams in combination of master lens and a converter lens. In these aberration diagrams, FIG. 7A, FIG. 8A, FIG. 9A, FIG. 10A, FIG. 11A, and FIG. 12A show a spherical aberration (SA), FIG. 7B, FIG. 8B, FIG. 9B, FIG. 10B, FIG. 11B and FIG. 12B show an astigmatism (AS), FIG. 7C, FIG. 8C, FIG. 9C, FIG. 10C, FIG. 11C and FIG. 12C show a distortion (DT), and FIG. 7D, FIG. 8D, FIG. 9D, FIG. 10D, FIG. 11D and FIG. 12D show a chromatic aberration of magnification (CC). Moreover, in each diagram, 'FIY' denotes the maximum image height.

Next, values of conditional expressions (1) to (11) in each example are described as below. Moreover, '-' (hyphen) indicates that there is no corresponding arrangement or conditional expression is not satisfied.

| Conditional expressions | Example1 | Example2 | Example3 |
|---|---|---|---|
| (1) \|f1\|/(B * D) | 0.684 | 0.584 | 0.572 |
| (2), (2') f21/f22 | 2.399 | 2.769 | 4.520 |
| (3) f23/f | 0.564 | 0.657 | 0.666 |
| (4) (r21f + r21r)/(r21f − r21r) | −0.075 | −0.385 | −0.472 |
| (5) (r22f + r22r)/(r22f − r22r) | −0.324 | −1.184 | −1.051 |
| (6) nd22N | 1.883 | 1.850 | 1.883 |
| (7) vd22N | 40.760 | 43.690 | 40.760 |
| (8), (8') f3/f | −1.119 | −1.410 | −1.590 |
| (9) f1/f23 | −2.772 | −3.185 | −3.430 |
| (10) f1/f | −1.564 | −2.091 | −2.286 |
| (11) f2/f | 0.333 | 0.411 | 0.444 |

| Conditional expressions | Example4 | Example5 | Example6 |
|---|---|---|---|
| (1) \|f1\|/(B * D) | 0.593 | 0.690 | 0.605 |
| (2), (2') f21/f22 | 3.482 | — | 2.532 |
| (3) f23/f | 0.644 | 0.671 | 0.562 |
| (4) (r21f + r21r)/(r21f − r21r) | −0.527 | — | 0.458 |
| (5) (r22f + r22r)/(r22f − r22r) | −1.018 | −0.357 | −0.770 |
| (6) nd22N | 1.879 | 1.883 | 1.883 |
| (7) vd22N | 30.805 | 40.760 | 40.760 |
| (8), (8') f3/f | −1.330 | −1.918 | −1.323 |
| (9) f1/f23 | −3.026 | −3.300 | −2.658 |
| (10) f1/f | −1.949 | −2.216 | −1.495 |
| (11) f2/f | 0.397 | 0.499 | 0.357 |

Figure 15:
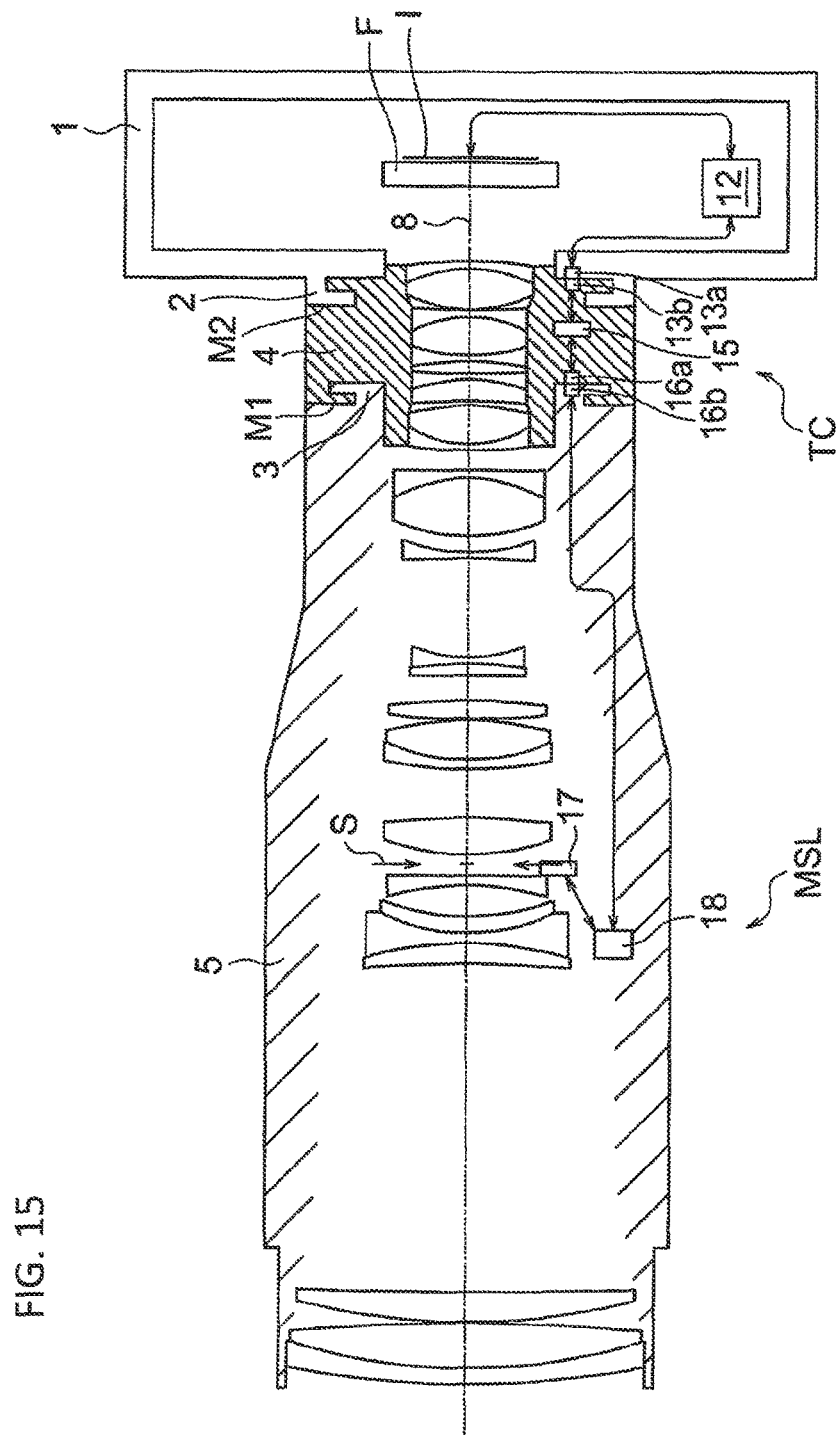
FIG. 15 is a cross sectional view of a photographing system, specifically a cross sectional view in which a master lens device and a converter lens device are attached to a camera.

FIG. 15 is a schematic cross-sectional view of an image pickup system in which, the converter lens device according to the present example and the master lens device have been combined as used in a taking lens.

An image pickup system is a camera system, which does not have a quick-return mirror, for example a single-lens mirrorless camera. The single-lens mirrorless camera is formed by a camera body 1, a converter lens device TC, and a master lens device MSL. The flange focal distance of the single-lens mirrorless camera can be shorter than that of a single-lens reflex camera.

The camera body 1 can include a mount 2, a filter F, an imaging pickup sensor disposed at imaging plane I, a control circuit 12, and an electric contact 13a. The control circuit 12 can. control the camera body 1, the master lens device MSL, and the converter lens device TC.

The converter lens device TC can include a converter lens, a first mount M1, a second mount M2, a holder 4 holding the converter lens, an electric contact 13b, 16a, and a control circuit 15. The control circuit 15 can transmit control information from the control circuit 12 to the control circuit 18.

The master lens device MSL can include a master lens, a mount 3, a holder 5 holding the master lens, an electric contact 16b, a control circuit 17, and a control circuit 18. The control circuit 17 can be a circuit for controlling an aperture stop S. The control circuit 18 can transmit control information of an aperture stop S to the control circuit 17 and controls focusing.

A screw type mount or a bayonet type mount may be used as the mount 2, 3, M1, M2. In FIG. 15, the bayonet type mount is used as the mount 2, 3, M1, M2.

The converter lens device TC can be attached to the master lens device MSL via the mount 3 and the first mount M1. The converter lens device TC can be attached to the camera body 1 via the mount 2 and the mount M2. In this way, the master lens device MSL and the converter lens device TC can be attached to the camera body 1. Therefore, the master lens, the converter lens, and the image pickup device can be aligned in the optical axis 8.

Electric contacts can be set on each mount. Therefore the control circuit 12, 15, 17, and 18 can be connected electrically by connecting the camera body 1, the master lens device MSL, and the converter lens device TC. In this way, an adjustment of the aperture stop and the adjustment of focusing can be performed by using the control circuit 12, 15, 17, and 18.

The converter lens of the converter lens device TC is a teleconverter lens. The abovementioned converter lenses in example 1 to 6 can be used as the teleconverter lens. Therefore, in the photographing system according to the present embodiment, a camera system having a relatively short flange focal distance can also acquire a high-quality image with a sufficient magnification.

The present invention can be useful for a converter lens that can reduce aberrations and has a sufficient magnification in spite of its short flange focal distance. And it can be also useful for a photographing system that has a sufficient magnification and can acquire high quality images.

What is claimed is:

1. A converter lens device comprising:
a first mount to which a master lens device is attached;
a second mount to which a camera body is attached; and
a converter lens having a negative refractive power, wherein,
a focal length, in which the converter lens and the master lens are combined, is longer than a focal length of the master lens,
the converter lens comprises a first lens unit of a positive refractive power, a second lens unit, and a third lens unit, wherein the first lens unit, the second lens unit and the third lens unit are ordered sequentially from an object side,
the converter lens includes no other lens units,
the first lens unit comprises a positive lens convex to an image side,
a total number of positive lens included in the first lens unit is one,
the second lens unit comprises a cemented triplet lens and a cemented doublet lens in any order from the object side,
the cemented triplet lens has a biconcave negative lens, a biconvex positive lens and a negative lens in any order from the object side,
the cemented doublet lens has a positive lens and a negative lens in any order from the object side,
a total number of lenses in the second lens unit is five,
the third lens unit comprises a negative lens and a positive lens in any order from the object side,
a total number of lenses in the third lens unit is two.

2. The converter lens device according to claim 1, wherein
the negative lens of the cemented triplet lens is a biconcave negative lens,
the cemented triplet lens comprises sequentially from an object side, the biconcave negative lens, the biconvex positive lens and the biconcave negative lens,
the cemented triplet lens has a negative refractive power.

3. The converter lens device according to claim 1, wherein
the negative lens of the cemented triplet lens is a negative meniscus lens,
the cemented triplet lens includes sequentially from an object side, the biconcave negative lens, the biconvex positive lens and the negative meniscus lens,
the cemented triplet lens has a negative refractive power.

4. The converter lens device according to claim 1, wherein
the negative lens of the cemented triplet lens is a negative meniscus lens having a concave surface facing the object side.

5. The converter lens device according to claim 1, wherein
the first lens unit consists of one cemented lens having the positive lens and a negative lens.

6. The converter lens device according to claim 1, wherein
the cemented doublet lens of the second lens unit has a negative refractive power.

7. The converter lens device according to claim 1, wherein
the second lens unit comprises sequentially from an object side, the cemented doublet lens and the cemented triplet lens.

8. The converter lens device according to claim 1, wherein
the third lens unit comprises a cemented doublet lens which includes sequentially from an object side, the positive lens and the negative lens.

9. The converter lens device according to claim 1, wherein
the second lens unit has a negative refractive power.

10. The converter lens device according to claim 9, wherein
the converter lens device satisfies conditional expression (1):

$$0.1 \leq |f|/(\beta \times D) \leq 0.87 \quad (1)$$

where
an object side of the converter lens device is a side closer to the first mount, an image side of the converter lens device is a side closer to the second mount,
f is a focal length of the converter lens,
β is a magnification of the converter lens, and
D is a thickness of the converter lens on an optical axis.

11. The converter lens device according to claim 1, wherein
the converter lens satisfies conditional expression (3):

$$0.3 \leq f_{23}/f \leq 0.9 \quad (3)$$

wherein
$f_{23}$ is a composite focal length of the second lens unit and the third lens unit, and
f is a focal length of the converter lens.

12. The converter lens device according to claim 1, wherein
the third lens unit has a positive refractive power.

13. The converter lens device according to claim 1, wherein
the converter lens device satisfies conditional expression (1):

$$0.1 \leq |f|/(\beta \times D) \leq 0.87 \quad (1)$$

where
an object side of the converter lens device is a side closer to the first mount, an image side of the converter lens device is a side closer to the second mount,
f is a focal length of the converter lens,
β is a magnification of the converter lens, and
D is a thickness of the converter lens on an optical axis.

14. A photographing system comprising:
a master lens device;
a camera body including an image pickup sensor; and
the converter lens device according to claim 1 attachable between the master lens device and the camera body, wherein
an optical system constituted by the master lens device and the converter lens device forms an image of an object, and
the image pickup sensor is disposed at an image position of the object and converts an image of the object into an electric signal.

* * * * *